(12) United States Patent
Tsurumi

(10) Patent No.: US 12,430,774 B2
(45) Date of Patent: Sep. 30, 2025

(54) INFORMATION PROCESSING DEVICE, PROGRAM, AND METHOD

(71) Applicant: SONY GROUP CORPORATION, Tokyo (JP)

(72) Inventor: Shingo Tsurumi, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 344 days.

(21) Appl. No.: 17/794,138

(22) PCT Filed: Jan. 12, 2021

(86) PCT No.: PCT/JP2021/000638
§ 371 (c)(1),
(2) Date: Jul. 20, 2022

(87) PCT Pub. No.: WO2021/153207
PCT Pub. Date: Aug. 5, 2021

(65) Prior Publication Data
US 2023/0049305 A1    Feb. 16, 2023

(30) Foreign Application Priority Data

Jan. 27, 2020    (JP) .................................. 2020-010551

(51) Int. Cl.
*G06T 7/246*    (2017.01)
*G06V 10/22*    (2022.01)
*G06V 40/10*    (2022.01)

(52) U.S. Cl.
CPC .............. *G06T 7/248* (2017.01); *G06V 10/22* (2022.01); *G06V 40/10* (2022.01);
(Continued)

(58) Field of Classification Search
CPC ................. G06T 7/248; G06T 2200/24; G06T 2207/10016; G06T 2207/20084;
(Continued)

(56) References Cited

U.S. PATENT DOCUMENTS

2006/0064396 A1*  3/2006  Wei ........................ A61B 6/463
2019/0147292 A1    5/2019  Watanabe

FOREIGN PATENT DOCUMENTS

JP    2010141668 A  *  6/2010
JP    2010211485 A  *  9/2010
(Continued)

OTHER PUBLICATIONS

Xu, U-Net with optima thresholding for small blob detection in medical images, 2019 IEEE 15th International Conference on Automation Science and Engineering (CASE) (Year: 2019).*

(Continued)

*Primary Examiner* — Vu Le
*Assistant Examiner* — Lei Zhao
(74) *Attorney, Agent, or Firm* — Paratus Law Group, PLLC

(57) ABSTRACT

An information processing device that includes a control unit configured to track an object in an image using images input in time series, using a tracking result obtained by performing tracking in units of a tracking region corresponding to a specific part of the object.

17 Claims, 16 Drawing Sheets

(52) U.S. Cl.
CPC ...... *G06T 2200/24* (2013.01); *G06T 2207/10016* (2013.01); *G06T 2207/20084* (2013.01); *G06T 2207/20092* (2013.01); *G06T 2207/30196* (2013.01); *G06T 2207/30244* (2013.01)

(58) Field of Classification Search
CPC . G06T 2207/20092; G06T 2207/30196; G06T 2207/30244; G06T 2207/20104; G06V 10/22; G06V 40/10
See application file for complete search history.

(56) References Cited

FOREIGN PATENT DOCUMENTS

| | | | | |
|---|---|---|---|---|
| JP | 2011181014 | A | * | 9/2011 |
| JP | 2016170603 | A | * | 9/2016 |
| JP | 2017212680 | A | * | 11/2017 ......... G06K 9/00228 |
| JP | 2018-148422 | A | | 9/2018 |
| KR | 10-0901904 | B1 | * | 6/2009 |
| KR | 10-1348142 | B1 | * | 1/2014 |

OTHER PUBLICATIONS

Chen, Camera handoff with adaptive resource management for multi-camera multi-object tracking, Image and Vision Computing 28 (2010) 851-864 (Year: 2010).*

Aras R Dargazany, "Human Body Parts Tracking: Applications to Activity Recognition", arxiv.org, Cornell University Library, 201 Olin Library Cornell University Ithaca, NY 14853, Jul. 2, 2019 (Jul. 2, 2019), XP081440916.

Wang J J et al, "Video analysis of human dynamics-a survey", Real-Time Imaging, Academic Press Limited, GB, vol. 9, No. 5, Oct. 1, 2003 (Oct. 1, 2003), pp. 320-345, XP004472531.

Cao et al., Realtime Multi-Person 2D Pose Estimation using Part Affinity Fields, Computer Vision and Pattern Recognition, 2017, pp. 7291-7299.

* cited by examiner

FIG. 7
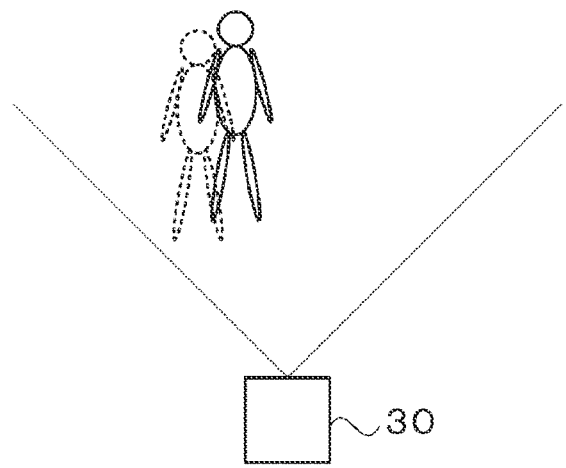
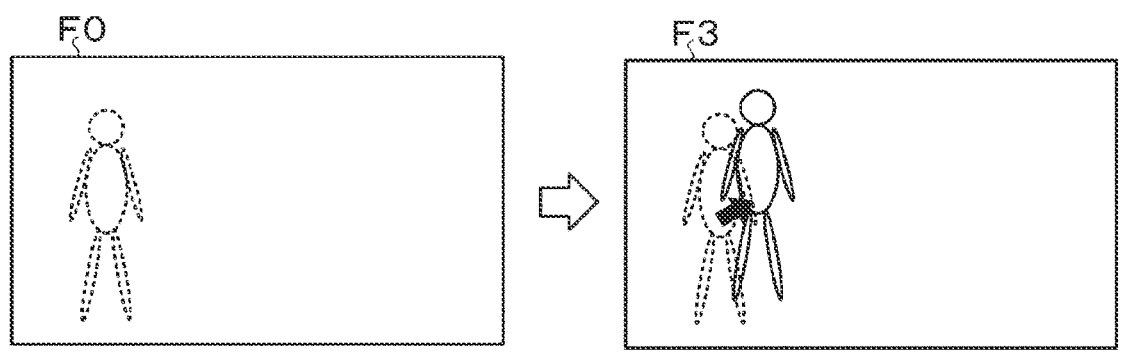

FIG. 8
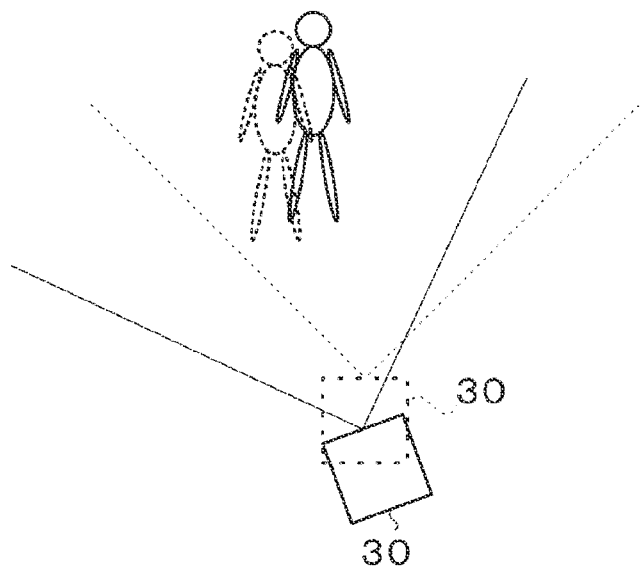
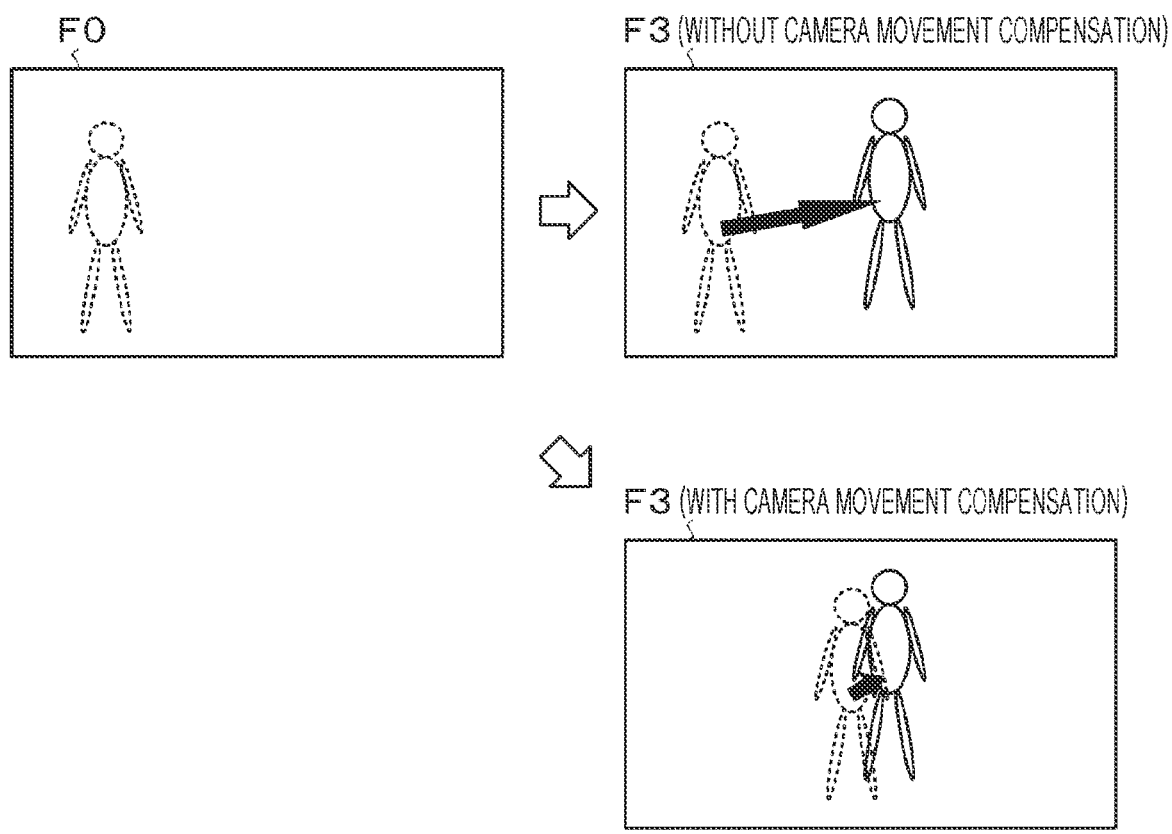

FIG. 12

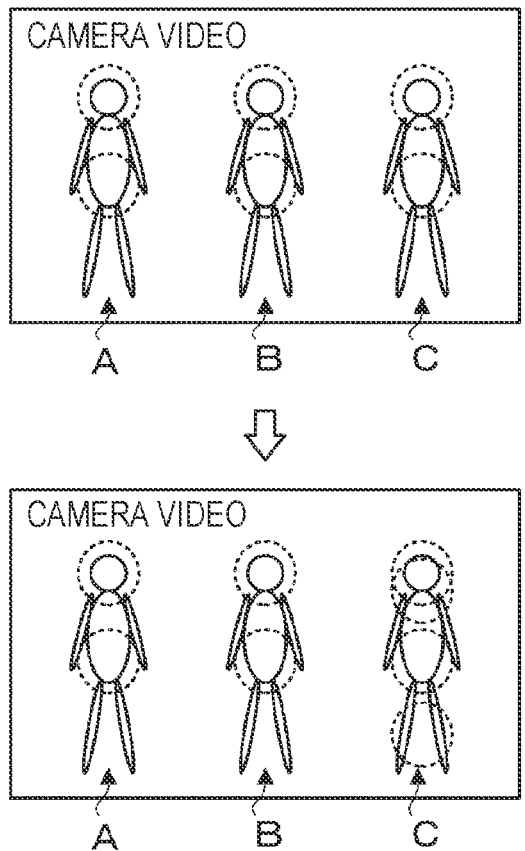

FIG. 13

| INDEX | PARAMETER |
|---|---|
| ATTRIBUTE OF PERSON | Gender: 0 TO 100 (0 TO 50: MALE, 50 TO 100: FEMALE)<br>Age: 0 TO 100 (ESTIMATED AGE VALUE) |
| BACKGROUND OF PERSON | Parts Score: SCORE OF SIMILARITY OBTAINED FROM CORRELATION DURING TRACKING |
| CPU LOAD | CPU Load: CPU LOAD OF ENTIRE SYSTEM |
| MOVEMENT INFORMATION | Velocity: MOVING VELOCITY OF PERSON IN THREE-DIMENSIONAL SPACE<br>Pose Velocity: MAGNITUDE OF POSE CHANGE OR RELATIVE CHANGE IN PART POSITION |

INFORMATION PROCESSING DEVICE, PROGRAM, AND METHOD

CROSS REFERENCE TO PRIOR APPLICATION

This application is a National Stage Patent Application of PCT International Patent Application No. PCT/JP2021/000638 (filed on Jan. 12, 2021) under 35 U.S.C. § 371, which claims priority to Japanese Patent Application No. 2020-010551 (filed on Jan. 27, 2020), which are all hereby incorporated by reference in their entirety.

TECHNICAL FIELD

The present technology relates to an information processing device, a program, and a method.

BACKGROUND ART

A technique for detecting an object such as a human body from an image is known. For example, Non-Patent Document 1 below discloses a technique of detecting part points of a human body from an image using a convolutional neural network (CNN), and capable of detecting the human body in a bottom-up manner from connection information between the detected part points.

CITATION LIST

Non-Patent Document

Non-Patent Document 1: Zhe Cao, Tomas Simon, Shih-En Wei, Yaser Sheikh, "Realtime Multi-Person 2D Pose Estimation using Part Affinity Fields", Proceeding of the IEEE Conference on Computer Vision and Pattern Recognition (CVPR), pp. 7291-7299, 2017

SUMMARY OF THE INVENTION

Problems to be Solved by the Invention

However, the above-described existing technique of detecting an object has a heavy, processing load. Therefore, for example, it is difficult to detect and track an object in real time (for example, 30 frames per second (fps)) using the existing detection technique.

An object of the present technology is to provide an information processing device, a program, and a method capable of suppressing a processing load when detecting and tracking an object from an image.

Solutions to Problems

The present technology is
an information processing device including:
a control unit configured to track an object in an image using images input in time series, using a tracking result obtained by performing tracking in units of a tracking region corresponding to a specific part of the object.

The present technology is
a program for causing an information processing device to execute an information processing method including:
by a control unit,
tracking an object in an image using images input in time series, using a tracking result obtained by performing tracking in units of a tracking region corresponding to a specific part of the object.

The present technology is
an information processing method including:
by a control unit,
tracking an object in an image using images input in time series, using a tracking result obtained by performing tracking in units of a tracking region corresponding to a specific part of the object.

BRIEF DESCRIPTION OF DRAWINGS

FIG. 7 is a diagram for describing movement of a human body in an image in a case where a camera does not move.

FIG. 8 is a diagram for describing movement of a human body in an image in a case where a camera moves.

FIG. 12 is a diagram for describing importance level determination processing.

FIG. 13 is a diagram illustrating a specific example of a determination index of an importance level.

MODE FOR CARRYING OUT THE INVENTION

An embodiment to be described below is a favorable specific example of the present technology, and various technically favorable limitations are added. However, the scope of the present technology is not limited to the following embodiment unless otherwise specified in the following description. Description of the present technology will be given in the following order.

<1. Embodiment>
[1-1. Configuration of Tracking System]
[1-2. Configuration of Arithmetic Processing Device]
"Human body detection processing"
"Human body tracking processing"
"Time delay compensation processing at start of tracking"
"Time delay compensation processing according to camera movement"
"Human body identification processing"
"Importance level determination processing"

"UI for tracking region specification"
[1-3. Overall Flow of Processing by Arithmetic Processing Device]
<2. Modification>
<3. Application>

1. Embodiment

[1-1. Configuration of Tracking System]

Figure 1:
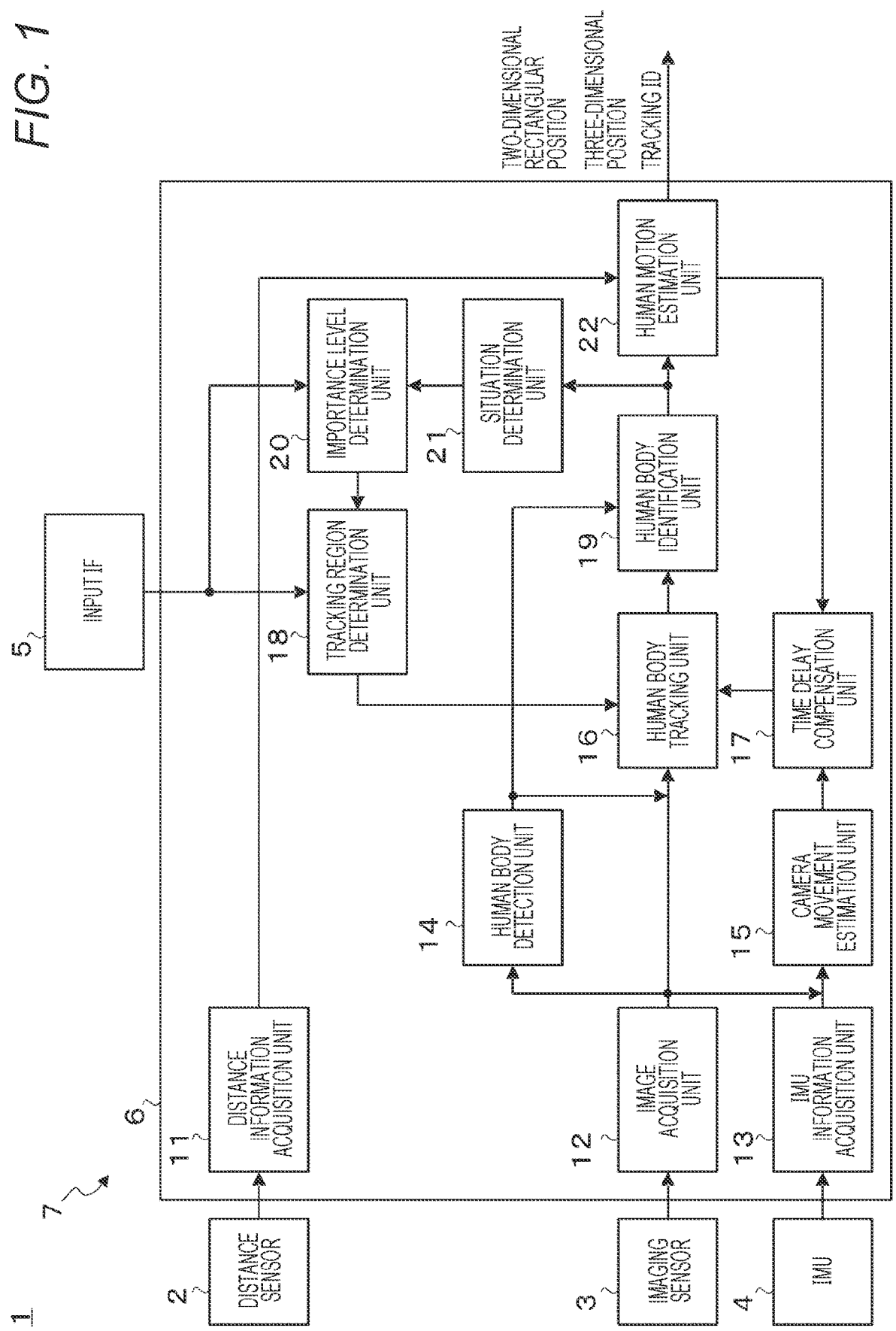
FIG. 1 is a block diagram illustrating a configuration example of a tracking system according to an embodiment of the present technology.

FIG. 1 is a block diagram illustrating a configuration example of a tracking system. A tracking system 1 illustrated in FIG. 1 tracks a human body in an image. The tracking system 1 includes a distance sensor 2, an imaging sensor 3, an inertial measurement unit (IMU) 4, an input interface (IF) 5, and an arithmetic processing device 6. Each of the distance sensor 2, the imaging sensor 3, the IMU 4, and the input IF 5 is connected to the arithmetic processing device 6. Note that this connection may be either wired or wireless.

The distance sensor 2 measures a distance to an object and outputs a measurement result as distance information. The distance sensor 2 includes, for example, a time of flight (ToF), a stereo camera, and the like. The imaging sensor 3 outputs image information captured at predetermined time intervals (for example, 30 frames per second (fps)). The imaging sensor 3 includes, for example, a charge coupled device (CCD), a complementary metal oxide semiconductor (CMOS), or the like. The IMU 4 outputs various measurement data (hereinafter, referred to as IMP information) such as angular velocity, acceleration, and self-position of three axes. The IMP 4 includes, for example, a sensor group such as a positioning sensor, a gyro sensor, a geomagnetic sensor, and an acceleration sensor.

The input IF 5 inputs various types of information from a user as input information, and includes, for example, a touch panel device in a smartphone or an input device such as a mouse and a keyboard in a personal computer. Specifically, the input IF 5 includes a user interface (UI) to be described below.

The arithmetic processing device 6, which is an example of a control unit, has a function to execute a tracking program (hereinafter simply referred to as a program). The arithmetic processing device 6 includes, for example, a processor such as a central processing unit (CPU) or a graphics processing unit (GPU). By executing the program, the arithmetic processing device 6 applies processing according to the program to the various types of information input from the distance sensor 2, the imaging sensor 3, the IMP 4, and the input IF 5, and outputs a processing result as output information.

Note that the arithmetic processing device 6 constitutes an information processing device 7 together with the input IF 5. Specifically, the information processing device 7 includes a computer such as a smartphone, a personal computer, or a microcomputer. More specific the information processing device 7 includes a storage device and an output interface (IF) (not illustrated) in addition to the input IF 5 and the arithmetic processing device 6. Each of the storage device and the output IF is connected to the arithmetic processing device 6. Note that this connection may also be either wired or wireless.

The storage device has a configuration to store the above-described program, various types of information (for example, information of various dictionaries to be described below) used in the processing by execution of the program, and the like. The storage device includes, for example, a read only memory (ROM) and a random access memory (RAM). Note that the program and various types of information may be stored in a storage device different from the storage device constituting the information processing device 7.

The output IF outputs information based on the processing result of the arithmetic processing device 6 in the information processing device 7. Specifically, the output IF includes an output device such as a display in the smartphone or the personal computer.

In the information processing device 7, specifically, the arithmetic processing device 6 reads the program stored in the storage device and executes the read program. The program may be provided or executed through an electric communication line. The information processing device 7 tracks a human body in an image using images input in time series, using a tracking result obtained by performing tracking in units of a tracking region corresponding to a specific part (for example, each of a head part, a neck part, a waist part, a knee part center, and the like) of the human body, by executing the program. That is, the program causes the information processing device 7 to execute processing of tracking a human body in an image using images input in time series, using a tracking result obtained by performing tracking in units of a tracking region corresponding to a specific part of the human body. Note that the information processing device 7 may include any one or more of the distance sensor 2, the imaging sensor 3, and the IMU 4.

[1-2. Configuration of Arithmetic Processing Device]

As illustrated in FIG. 1, the arithmetic processing device 6 includes a distance information acquisition unit 11, an image acquisition unit 12, an IMU information acquisition unit 13, a human body detection unit 14, a camera movement estimation unit 15, a human body tracking unit 16, a time delay compensation unit 17, a tracking region determination unit 18, a human body identification unit 19, an importance level determination unit 20, a situation determination unit 21, and a human motion estimation unit 22 as functional blocks that function by execution of the above-described program. Note that the function by each functional block of the arithmetic processing device 6 may be implemented not only by execution of the program but also by a combination of a dedicated device, a circuit, and the like by hardware having the functions.

The distance information acquisition unit 11 acquires the distance information from the distance sensor 2 and supplies the acquired distance information to the human motion estimation unit 22. The image acquisition unit 12 acquires the image information (for example, the image information of 30 fps) of a captured video from the imaging sensor 3, and supplies the acquired image information to the human body detection unit 14, the camera movement estimation unit 15, and the human body tracking unit 16. The IMP information acquisition unit 13 acquires the MU information from the IMP 4 and supplies the acquired IMU information to the camera movement estimation unit 15.

The human body detection unit 14 extracts configuration elements of the human body in an image using images input in time series, and detects the human body in the image using an extraction result. Furthermore, the human body detection unit 14 detects the human body in the image for each predetermined number of frames (for example, 10 frames) that is equal to or larger than the number of frames required to detect the human body in the image (specifically, from start of detection to completion of detection). Here, the human body detection processing for detecting the human body will be described in detail.

"Human Body Detection Processing"

Figure 2:
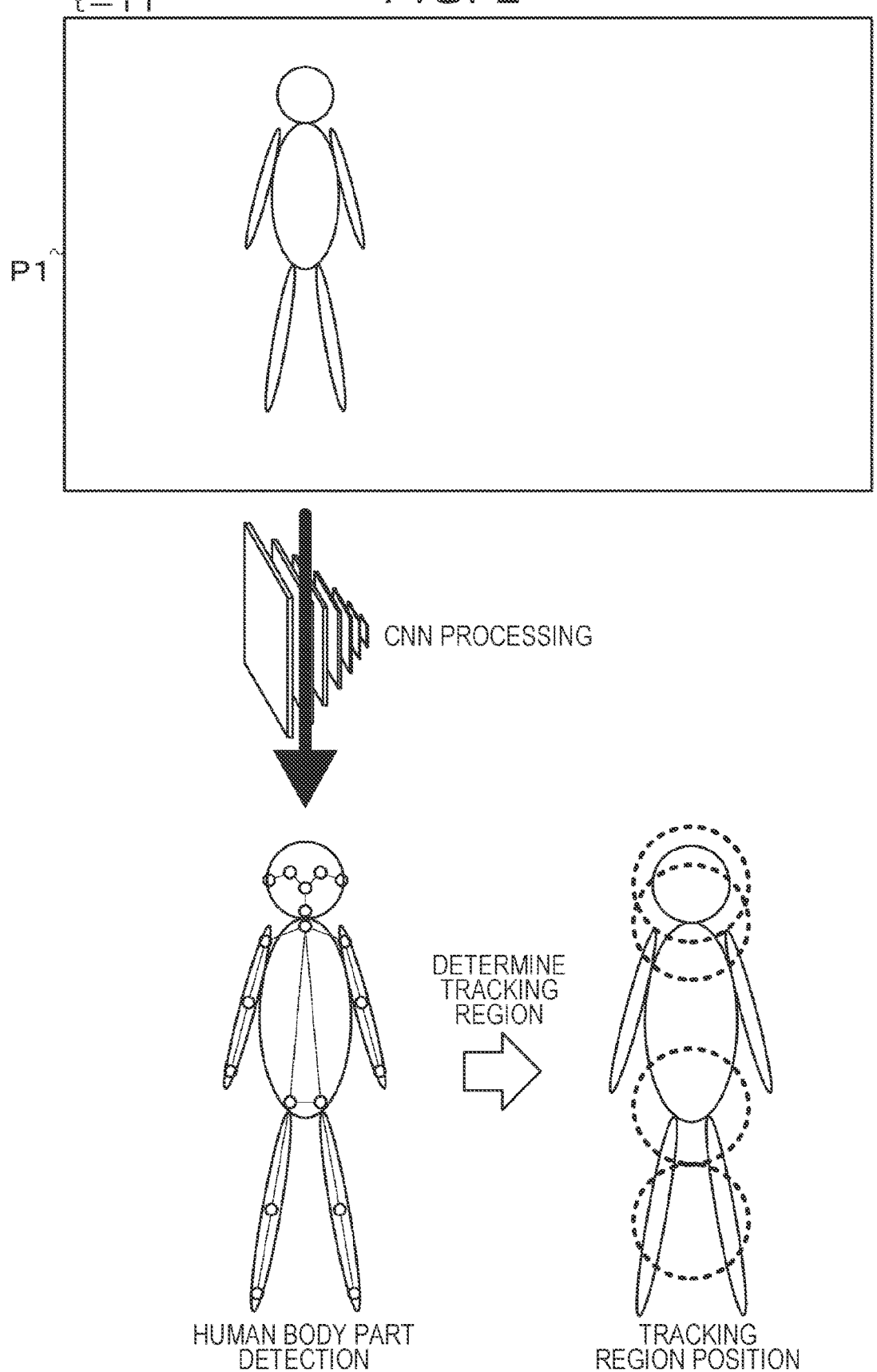
FIG. 2 is a diagram for describing human body detection processing.

FIG. 2 is a diagram for describing the human body detection processing in the human body detection unit 14.

Specifically, the human body detection unit 14 detects a human body using an image analysis technique using deep learning. For example, as illustrated, the human body, detection unit 14 executes first convolutional neural network (CNN) processing for the image information of an image P1 of an entire image or a partially cutout region captured at time t=T1 supplied from the image acquisition unit 12. In the first CNN processing, a human body part is detected from the image information using a learned model, and the position is estimated. Here, the human body part is a part constituting the human body such as a skeleton (a configuration element of the human body).

The human body detection unit 14 estimates the positions of the specific parts (for example, four positions of the head part, the neck part, the waist part, and the knee part center) of the human body using the detected human body parts. This estimation result is used in initialization processing in tracking processing to be described below. Specifically, the estimation result is used to set tracking regions (the regions indicated by the broken lines in FIG. 2) corresponding to the specific parts of the human body.

Specifically, the human body detection unit 14 estimates the positions of the human body parts as follows. The human body detection unit 14 extracts part points (for example, nineteen points of left eye, right eye, nose, left ear, right ear, mouth, neck, left shoulder, right shoulder, left elbow, right elbow, left wrist, right wrist, left hip joint, right hip joint, left knee, right knee, left ankle, and right ankle) for specifying the human body parts from the image information. The human body detection unit 14 detects the human body parts on the basis of the extraction result and estimates the positions. Then, when a required number or more of human body parts are detected, it is determined that the human body has been detected.

Note that, in a case where there is a plurality of persons in the image, the human body detection unit 14 detects each person. When it is determined that the human body has been detected, the human body detection unit 14 supplies detection information based on the detection result to the human body tracking unit 16 and the human body identification unit 19. For example, examples of the detection information include information regarding the part points of the human body, the human body parts, the specific parts of the human body, a human body region (specifically, two-dimensional rectangular position), and the like described above.

For example, the human body detection processing in the human body detection unit 14 is implemented using an image analysis technique such as "OpenPose" disclosed in Non-Patent Document 1 described above. The human body detection processing in the human body detection unit 14 has a heavy processing load and is difficult to perform real-time processing for each frame. Therefore, the human body detection unit 14 performs the human body detection processing for each predetermined number of frames as described above. That is, the human body detection unit 14 periodically performs the human body detection processing even during the tracking of the human body by the human body tracking unit 16 to be described below, and provides the human body tracking unit 16 with highly reliable detection information actually detected from the image. Note that the above-described determination of the human body parts and the specific parts of the human body is not limited thereto. For example, the specific parts of the human body may be directly determined from the part points.

The camera movement estimation unit 15 illustrated in FIG. 1 estimates the movement of a moving camera between the images using the image information supplied from the image acquisition unit 12, the IMU information supplied from the IMU information acquisition unit 13, and the like, and supplies camera movement information based on an estimation result to the time delay compensation unit 17. For example, the camera movement estimation unit 15 may use image analysis processing such as visual odometry when obtaining the movement of the camera.

The human body tracking unit 16 tracks the human body in the image using images input in time series, using the tracking result obtained by performing tracking in units of a tracking region corresponding to the specific part of the human body. Furthermore, the human body tracking unit 16 tracks the human body in the image by real-time processing for each frame. Note that one or more tracking regions are used for tracking, and the human body tracking unit 16 selects a tracking region to be used for tracking in units of a tracking region from a plurality of candidates. In a case of performing tracking using a plurality of tracking regions, the human body tracking unit 16 tracks the human body in the image on the basis of the tracking result obtained by performing tracking in each of the tracking regions. Here, the human body tracking processing for tracking the human body will be described in detail.

"Human Body Tracking Processing"

Figure 3:
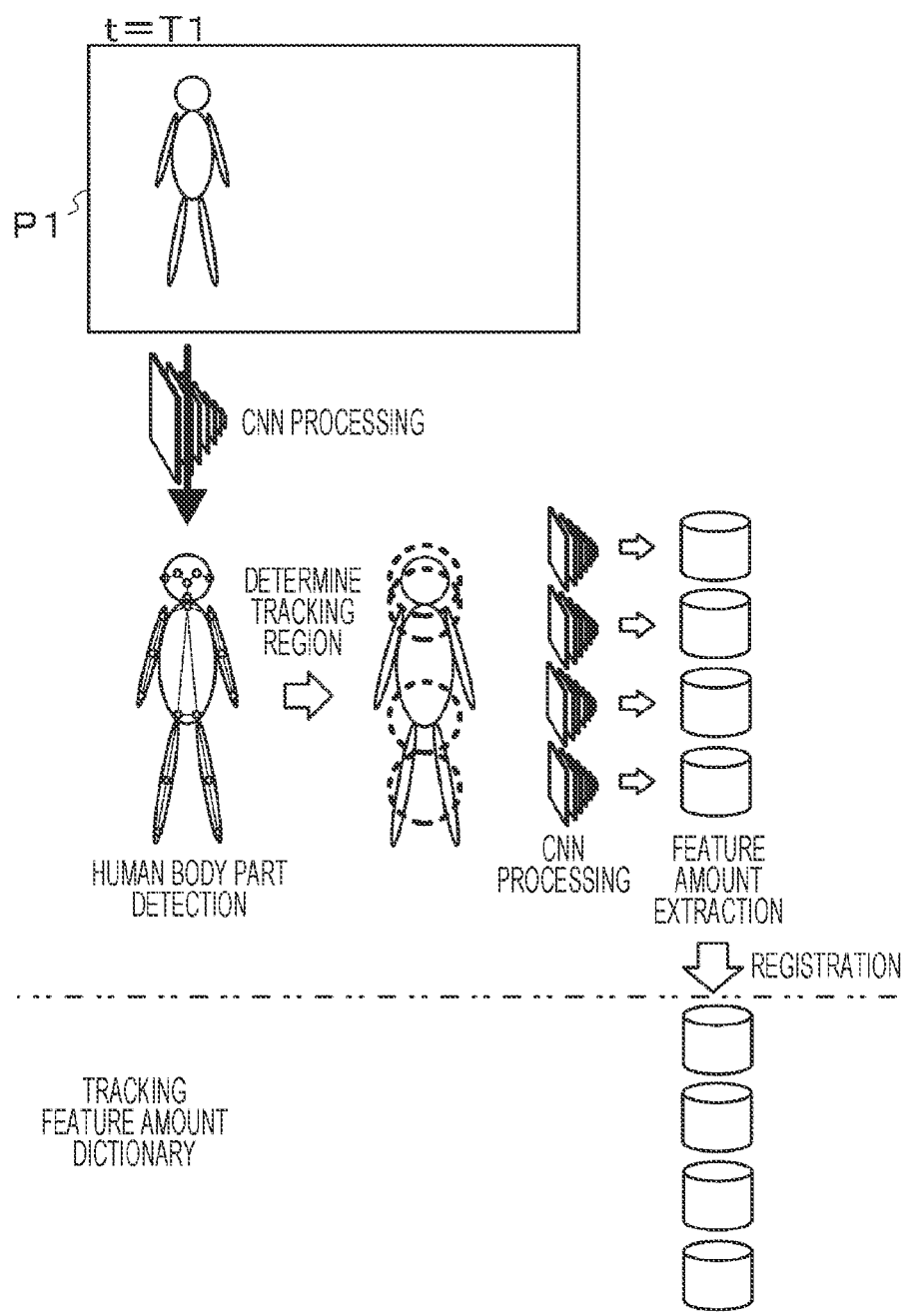
FIG. 3 is a diagram for describing a specific example of a tracking feature amount dictionary.
Figure 4:
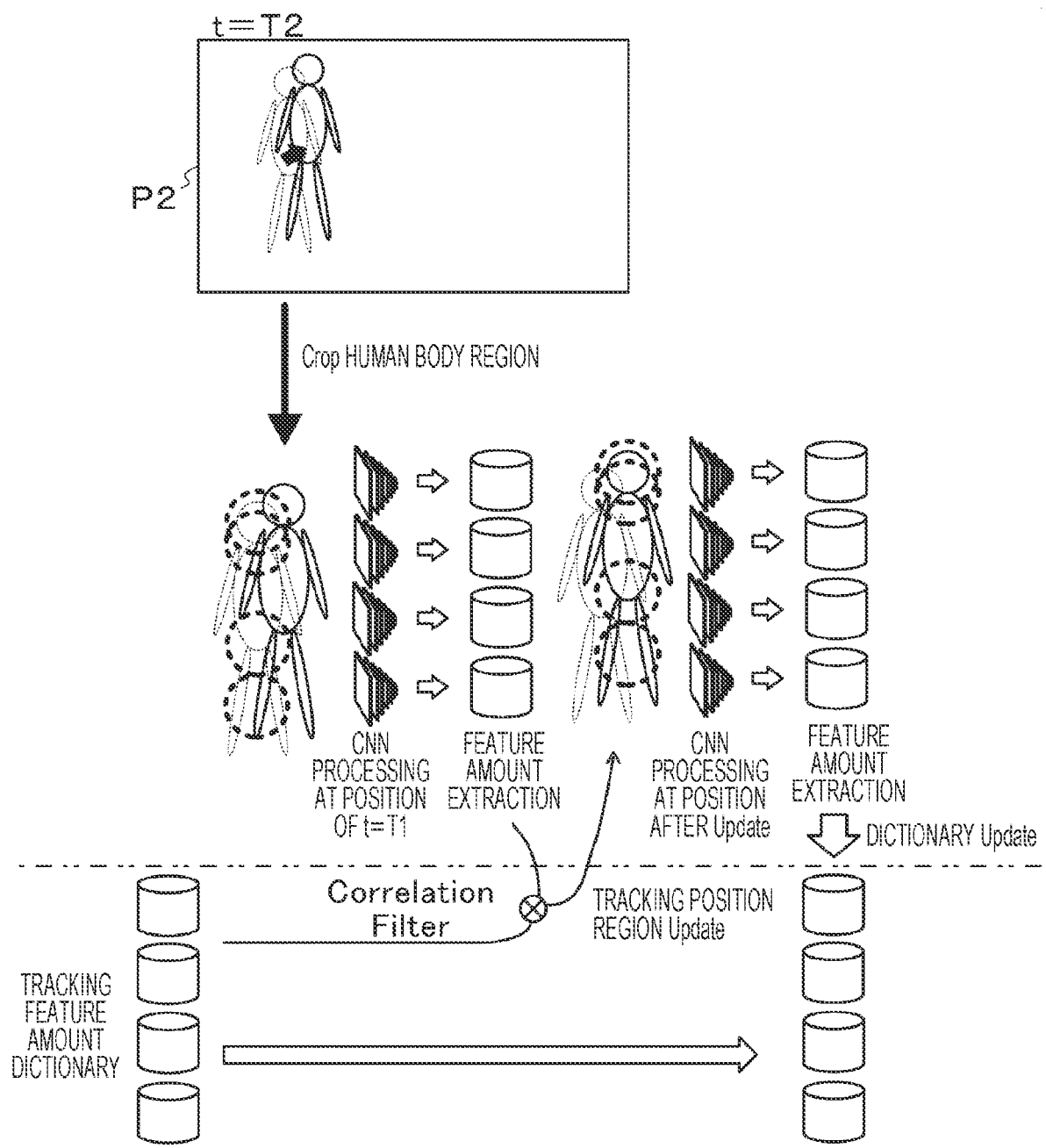
FIG. 4 is a diagram for describing human body tracking processing.

FIG. 3 is a diagram for describing a specific example of a tracking feature amount dictionary used in the human body processing, and FIG. 4 is a diagram for describing the human body tracking processing in the human body tracking unit 16. The human body tracking unit 1 illustrated in FIG. 1 tracks the human body detected by the human body detection unit 14. Specifically, the human body tracking unit 16 performs tracking by estimating where the tracking region one frame before has moved to in the next frame using correlation calculation. Note that, as described above, the human body tracking unit 16 tracks not the entire human body but the human body in units of a tracking region corresponding to the specific part of the human body, and tracks the human body by integrating tracking results for the respective tracking regions.

When tracking the human body, the human body tracking unit 16 first sets the tracking region for tracking and creates the tracking feature amount dictionary by the initialization processing. For example, as illustrated in FIG. 3, in a case where the human body is detected from the image P1 at the time t=T1, the human body tracking unit 16 sets the tracking region on the basis of the image information, the detection information, setting information, and the like. Here, the setting information is information indicating which tracking region corresponding to which part of the human body is used for tracking. For example, in the example illustrated in FIG. 3, the human body tracking unit 16 has set the four tracking regions (the parts corresponding to the four parts of the head part, the neck part, the waist part, and the knee part indicated by the broken lines) corresponding to the specific parts of the human body described above. For example, as illustrated in FIG. 3, the tracking region corresponding to the head part includes six part points of the left eye, right eye, nose, left ear, right ear, and mouth. Here, the tracking region includes one or more part points, and the number of tracking regions that can be used for tracking is set to be smaller than the number of part points.

Then, the human body tracking unit 16 executes second CNN processing for each set tracking region. The second CNN processing extracts a feature amount for determining likelihood of a predetermined part of the human body (for example, in the case of the head part, likelihood of the head part) by the learned model. Then, the human body tracking unit 16 registers the extracted feature amounts of the tracking region in the tracking feature amount dictionary.

The human body tracking unit 16 performs tracking using the tracking feature amount dictionary. For example, in the case of tracking the head part, the human body tracking unit 16 obtains a center position of the head part in consideration of arrangement of the part points and can also recognize the scale from comparison of the image information, and thus tracks the head part by correlation from the position and the scale. For example, as illustrated in FIG. 4, the human body tracking unit 16 crops (extracts) a human body region from a capture image P2 at the time t=T2 (the time after the time t=T1), and executes the second CNN processing corresponding to each tracking region at the position t=T1 to extract each feature amount. Then, the human body tracking unit 16 updates the position of the tracking region by passing the feature amount and the feature amount of the tracking feature amount dictionary through a correlation filter. Then, the human body tracking unit 16 again executes the second CNN processing corresponding to each tracking region at the updated position to extract each feature amount. The human body tracking unit 16 updates the tracking feature amount dictionary with the extracted feature amount and updates the tracking feature amount dictionary. The human body tracking unit 16 supplies tracking information based on a tracking result of the human body to the human body identification unit 19. In this manner, the human body tracking unit 16 substantially tracks the human body by updating the tracking feature amount dictionary in which the tracking results obtained by performing tracking in the respective tracking regions are integrated.

For example, the human body tracking processing in the human body tracking unit 16 is implemented using a general tracking method such as a Kernelized Correlation Filter (KCF). Since the human body tracking processing in the human body tracking unit 16 performs tracking in units of a tracking region as described above, the processing load is low, and for example, even in the case of simultaneously tracking a plurality of persons, real-time processing can be performed for each frame. Therefore, the human body tracking unit 16 performs the human body tracking processing for each frame as described above.

Note that, as described above, the human body detection unit 14 performs the human body detection processing for each predetermined number of frames, and supplies the detection information to the human body tracking unit 16. The human body tracking unit 16 performs the above-described initialization processing each time. As a result, the human body tracking unit 16 updates the tracking feature amount dictionary in a checking-answers manner using the detection information with high reliability, and updates the tracking feature amount dictionary described above using the tracking feature amount dictionary and corrects a tracking position using correction information to be described below, and the like.

Here, in a case where the human body detection processing by the human body detection unit 14 takes time, a non-negligible time delay occurs between the frame in which the human body is detected and the frame being tracked. Therefore, a large difference due to the time delay occurs between the position of the human body detected by the human body detection unit 14 and the position of the human body actually reflected at the start of tracking by the human body tracking unit 16. Therefore, the human body tracking unit 16 compensates for the time delay at the start of tracking on the basis of the correction information supplied from the time delay compensation unit 17 to be described below and then corrects the human body position, and updates the tracking feature amount dictionary. Furthermore, the human body tracking unit 16 also performs time delay compensation according to the camera movement in the case of the moving camera and time delay compensation according to the motion estimation of the human body on the basis of the correction information supplied from the time delay compensation unit 17. Note that the human body tracking unit 16 may perform only updating of the tracking feature amount dictionary without correcting the human body position.

The time delay compensation unit 17 illustrated in FIG. 1 performs compensation processing of compensating for the movement of the person from the start of detection to the completion of detection of the human body in the human body detection unit 14 described above. Specifically, the time delay compensation unit 17 predicts the current position of the human body using the camera movement information supplied from the camera movement estimation unit 15, motion information supplied from the human motion estimation unit 22, and the like. Then, the time delay compensation unit 17 generates the correction information based on the prediction, and supplies the generated correction information to the human body tracking unit 16. Here, the time delay compensation processing of compensating for the time delay will be described in detail.

"Time Delay Compensation Processing at Start of Tracking"

Figure 5:
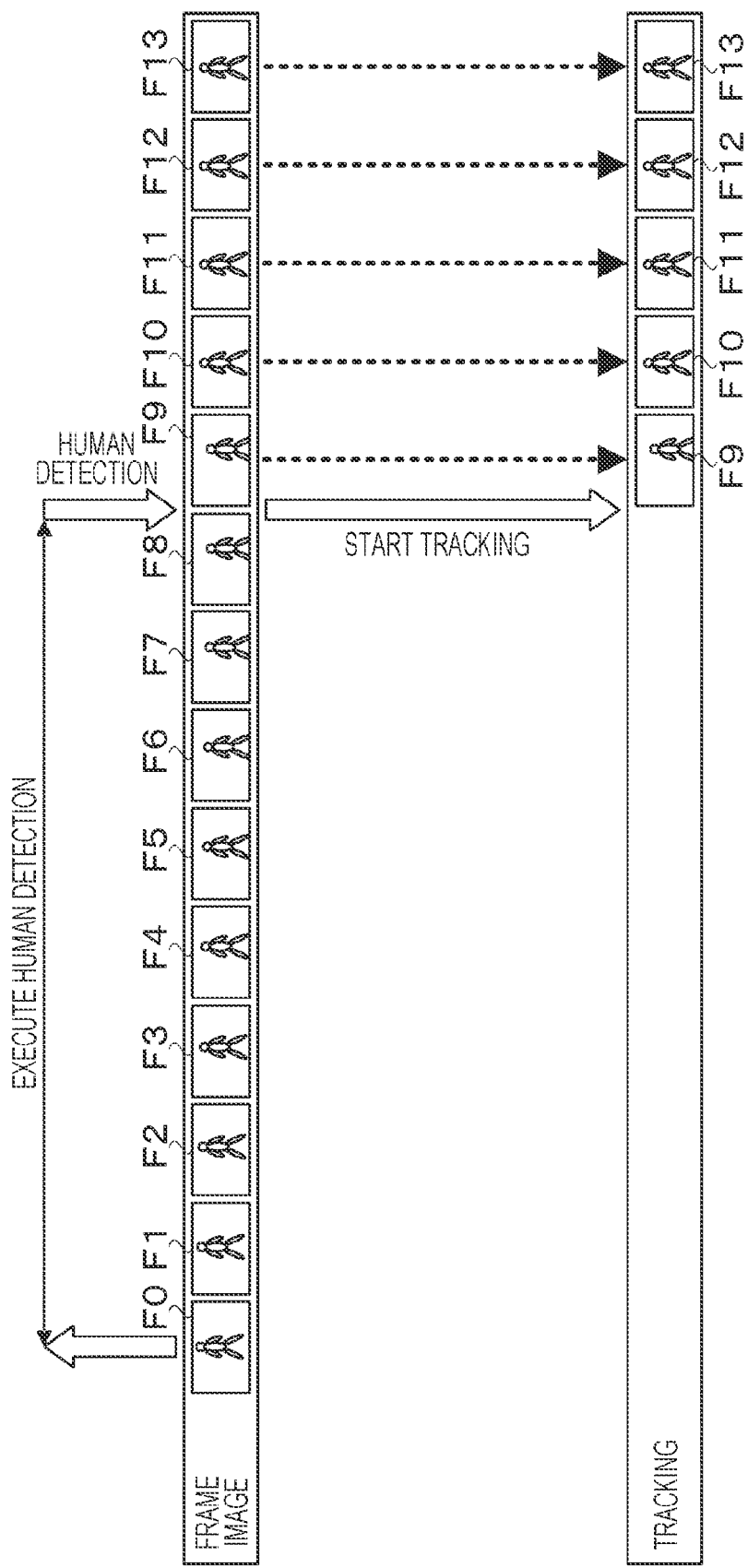
FIG. 5 is a diagram for describing necessity of time delay compensation processing at the start of tracking.

FIG. 5 is a diagram for describing necessity of the time delay compensation processing at the start of tracking. As described above, the human body detection processing by the human body detection unit 14 is performed for each predetermined number of frames (for each nine frames in the example illustrated in FIG. 5). A frame in which the first human body detection processing is performed for a certain person is assumed to be a frame F0, and subsequent frames are assumed to be frames F1, F2, F3, and the like. In this case, in a case where the time delay compensation processing at the start of tracking is not performed, an image of or after the current frame F9 at the start of tracking is used for tracking by the human body tracking unit 16. When the tracking is started from the frame F9 without any change, it is equivalent to performing the tracking while skipping the frames F1 to F8. Since there is a high possibility that the movement amount of the person in the image increases between the frames F0 to F9, there is a problem that the tracking person is likely to be lost in the human body tracking processing in the frame F9. Therefore, the time delay compensation unit 17 performs the time delay compensation at the start of tracking as follows.

Figure 6:
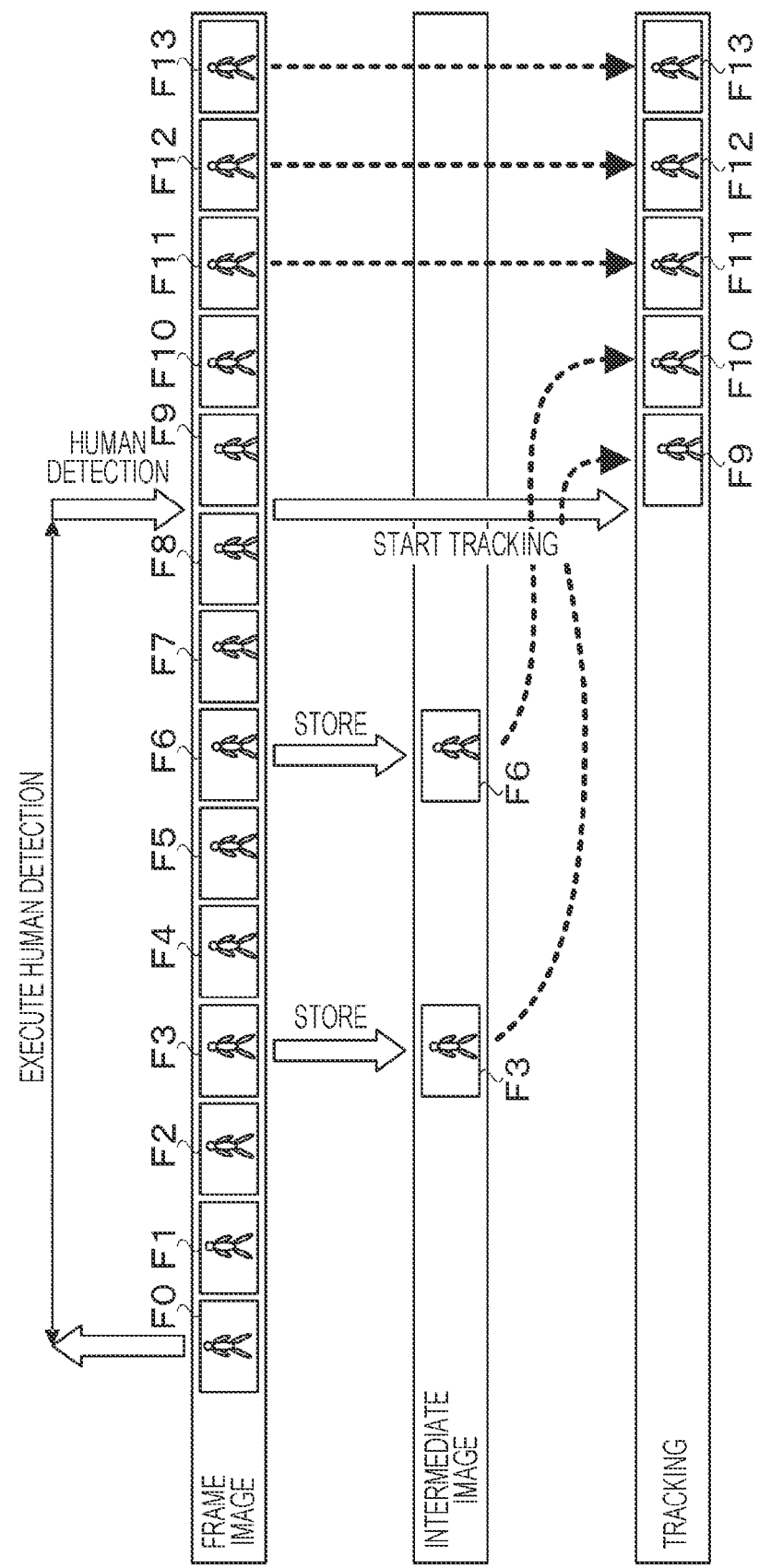
FIG. 6 is a diagram for describing the time delay compensation processing at the start of tracking.

FIG. 6 is a diagram for describing the time delay compensation processing at the start of tracking. The time delay compensation unit 17 generates information for causing the human body tracking unit 16 to store intermediate images and perform tracking with the intermediate images as the correction information by the time delay compensation processing at the start of tracking, and supplies the correction information to the human body tracking unit 16. For example, as illustrated, it is assumed that the human body detection is started in the frame F0, the human body detection is completed in the frame F8, and the human body tracking is started from the frame P9. In this case, the time delay compensation unit 17 causes the human body tracking unit 16 to store the frame images (in the illustrated example, the images of the frames F3 and F6) during an execution period of the human body detection as intermediate images. Then, in the human body tracking processing in the frames F9 and F10 immediately after the start of tracking, tracking is sequentially performed using the stored intermediate images (the images of the frames F3 and F6) instead of the images of the frames F9 and F10. That is, in a case where the tracking is started, the human body tracking unit 16 sequentially executes the tracking using the images stored as the intermediate images at first. After performing the tracking using all the saved intermediate images (in the illustrated example, on or after the frame F11), the tracking is performed with the current frame image. As a result, the number of frames skipped at the start of tracking is reduced. By reducing the number of frames skipped in this manner, a loss occurrence rate immediately after the start of tracking as described above can be reduced.

"Time Delay Compensation Processing According to Camera Movement"

FIG. 7 is a diagram for describing movement of the human body in the image in a case where the camera does not move, and FIG. 8 is a diagram for describing movement of the human body in the image in a case where the camera moves. As illustrated in FIG. 7, in a case where a camera 30 including the imaging sensor 3 is a fixed camera or the like and does not move, an influence of the time delay caused by the movement of the camera 30 does not occur. For example, in the case of the example illustrated in FIG. 6, since the movement of the person in the image is small from the frame F0 to the frame F3, the loss occurrence rate is low, and it is easy to connect detection and tracking.

On the other hand, as illustrated in FIG. 8, in a case where the camera 30 is a moving camera, the influence of the time delay caused by the camera movement becomes large. For example, it is assumed that broken lines in the drawing indicate the positions of the person and the camera 30 in the frame F0 in FIG. 6. In this case, in a case where the time delay compensation according to the camera movement is not performed, when the person and the camera 30 move to the positions of the solid lines by the frame F3, as illustrated in FIG. 8, the movement of the person in the image becomes larger than the actual movement of the person, and it becomes difficult to connect detection and tracking. That is, the loss occurrence rate is increased. Therefore, the time delay compensation unit 17 performs the time delay compensation processing according to the camera movement so that the camera movement of the camera 30 does not affect the movement of the person in the image.

Specifically, the time delay compensation unit 17 generates, as the correction information, information for causing the human body, tracking unit 16 to correct the human body position so as to cancel the camera movement by the time delay compensation processing according to the camera movement, and supplies the correction information to the human body tracking unit 16. More specifically, the time delay compensation unit 17 also stores information regarding the movement of the camera 30 at the time of storing the above-described intermediate images. Then, the time delay compensation unit 17 sets the position of the human body detection used at the start of tracking in the human body tracking unit 16 as the position where the movement of the camera 30 is canceled according to the correction information. As a result, the loss occurrence rate due to the time delay caused by the camera movement can also be reduced. This is particularly effective in a case where the movement of the camera 30 is large.

Figure 9:
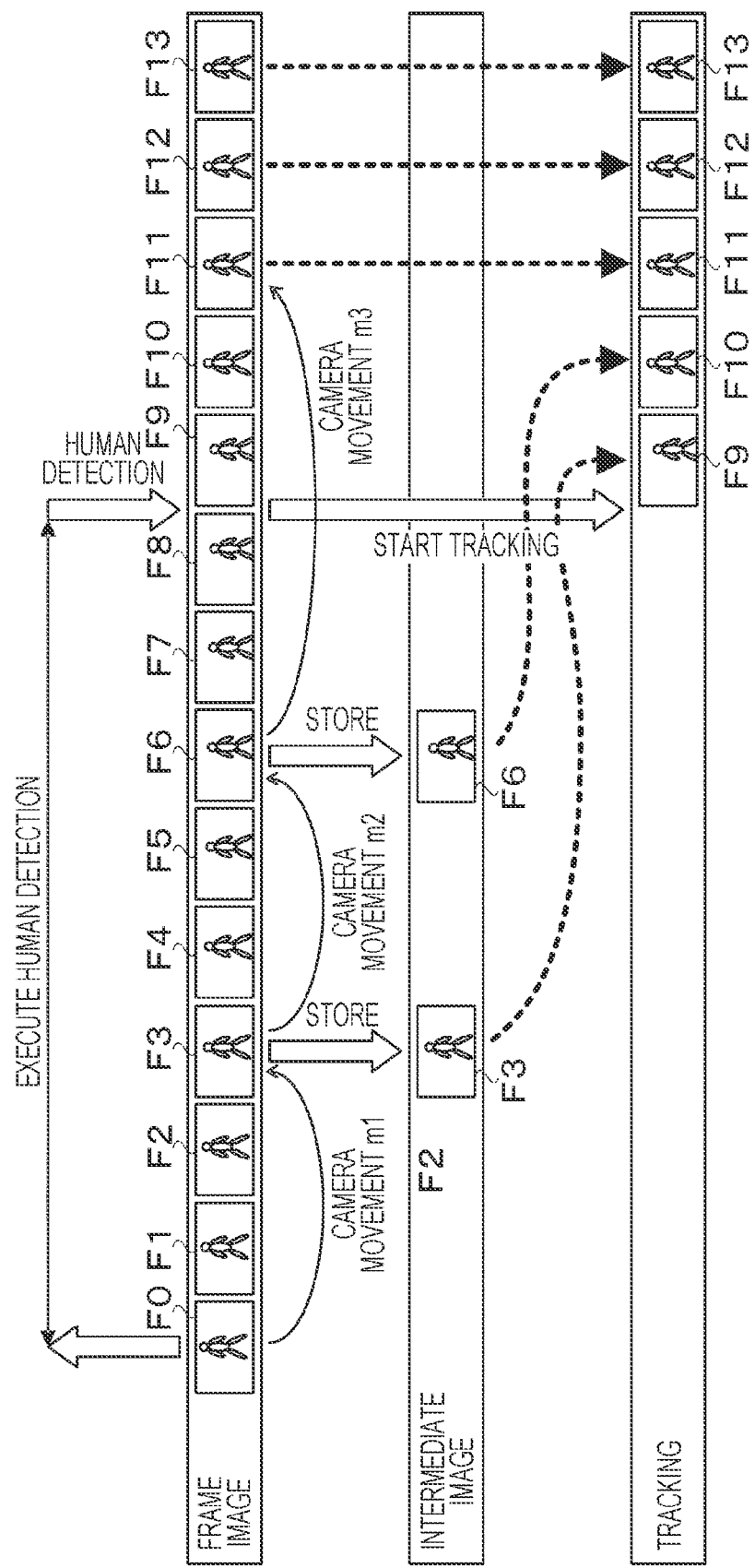
FIG. 9 is a diagram for describing the time delay compensation processing according to camera movement.

FIG. 9 is a diagram for describing the time delay compensation processing according to camera movement. For example, in the case of the example illustrated in FIG. 9, the following processing is performed in addition to the above-described time delay compensation processing at the start of tracking. When the human body tracking unit 16 executes tracking with the image stored as the intermediate image (the image of the frame F3), the time delay compensation unit 17 sets the position of human body detection in the frame F0 to the position where movement m1 of the camera 30 is canceled. That is, the time delay compensation unit 17 obtains the movement m1 of the camera 30 from the frame F0 to the frame F3, and moves the person detection position in the frame F0 in a direction (to the position) of canceling the movement. Thereby, the movement of the person in the image is made small and connection from detection to tracking becomes easy. Similarly, when tracking is executed with the image of the frame F6, the person detection position in the frame F3 is set to a position where camera movement m2 is canceled. Furthermore, when tracking is executed with the frame F11, a position where camera movement m3 is canceled is set. Note that the time delay compensation unit 17 may perform the time delay compensation processing according to the camera movement at a time other than the start of tracking.

Here, the description returns to FIG. 1. The tracking region determination unit 18 illustrated in FIG. 1 determines the tracking region to be used for tracking for each human body on the basis of the input information supplied from the input IF 5 or importance level information supplied from the importance level determination unit 20, and supplies setting information based on the determination to the human body tracking unit 16.

The human body identification unit 19 identifies whether or not a new person in the image is a predetermined person on the basis of a state (specifically pose) represented by a plurality of human body parts of each person. Specifically, the human body identification unit 19 identifies the detected human body and the human body being tracked on the basis of the detection information supplied from the human body detection unit 14 and the tracking information supplied from the human body tracking unit 16. Then, the human body identification unit 19 supplies identification information based on an identification result to the situation determination unit 21 and the human motion estimation unit 22. More specifically, the human body identification unit 19 identifies a newly detected person when tracking is interrupted due to hiding, missing, or the like in the image. Here, human body identification processing for identifying the human body will be described in detail.

"Human Body Identification Processing"

Figure 10:
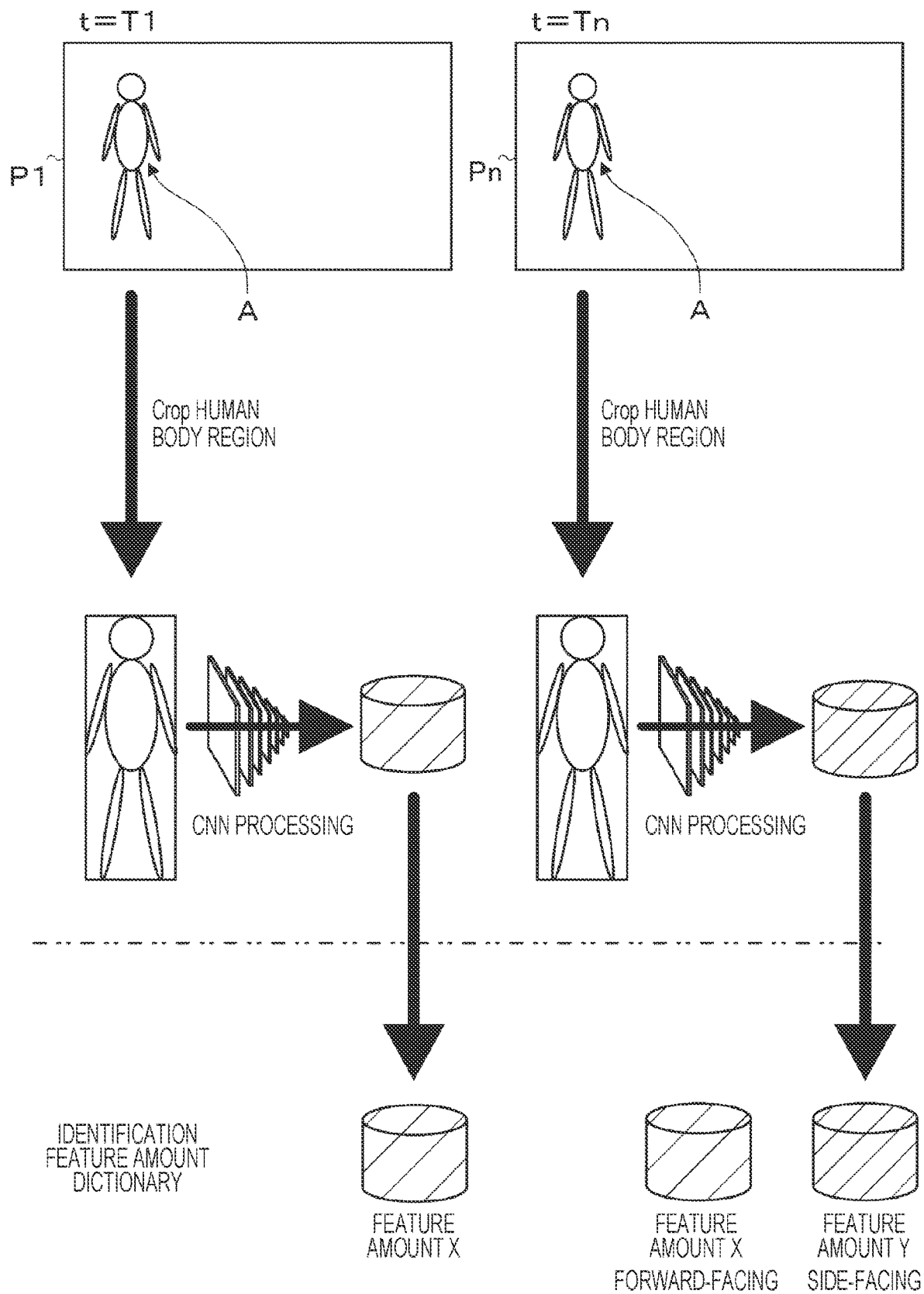
FIG. 10 is a diagram for describing a specific example of an identification feature amount dictionary.
Figure 11:
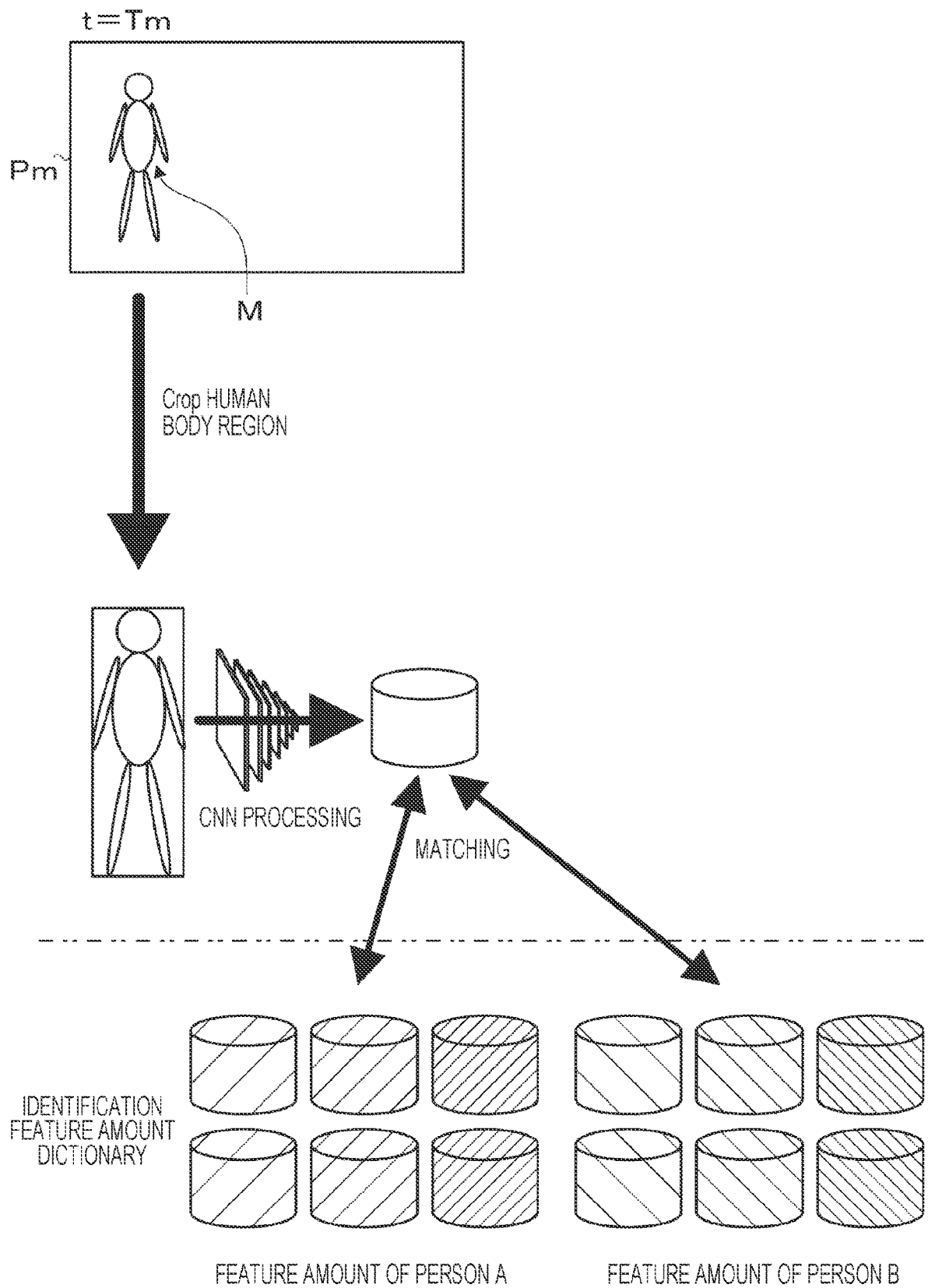
FIG. 11 is a diagram for describing human body identification processing.

FIG. 10 is a diagram for describing a specific example of an identification feature amount dictionary in the human identification processing, and FIG. 11 is a diagram for describing the human body identification processing in the human body identification unit 19. When identifying the human body, the human body identification unit 19 first extracts a feature amount regarding a pose from the human body region being tracked and registers a plurality of the feature amounts per person. For example, as illustrated in FIG. 10, the human body identification unit 19 crops the human body region of a tracking person A from the image P1 at the time t=T1, applies third CNN processing, and registers a feature amount X regarding a forward-facing pose. Note that the third CNN processing extracts a feature amount for determining a human body pose by the learned model.

Similarly, the human body identification unit 19 crops the human body region of the same tracking person A from an image Pn at time t=Tn (later time of the time t=T1), applies the third CNN processing, and registers a feature amount Y regarding a side-facing pose. In this manner, the human body identification unit 19 accumulates the feature amounts X, Y, and the like regarding various poses of each person in the identification feature amount dictionary. Note that each of the feature amounts X, Y, and the like is registered in association with a human body identification ID capable of identifying each human body.

The human body identification by the human body identification processing is performed by matching with the identification feature amount dictionary in this state. For example, as illustrated in FIG. 11, it is assumed that a new person M appears at time t=Tm after the tracking person deviates from the frame. In this case, the human body identification unit 19 crops the human body region from a capture image Pm at the time t=Tm, and applies the third CNN processing to extract the feature amount. Then, the human body identification unit 19 performs matching between the extracted feature amount and the feature amount registered in the identification feature amount dictionary, and determines whether or not the person F is the tracking person (human body identification). Then, the human body identification unit 19 supplies identification information based on an identification result to the situation determination unit 21 and the human motion estimation unit 22.

Note that the registration (accumulation) timing in the identification feature amount dictionary by the human body identification unit 19 can be appropriately set, for example, every time tracking is performed in each frame image, and is favorably performed at the detection timing of the human body part by the human body detection unit 14. Thereby, the pose can be accurately obtained from the position of the human body part illustrated in FIG. 2, and a plurality of highly accurate feature amounts can be accumulated for each pose.

Here, the description returns to FIG. 1. The importance level determination unit 20 illustrated in FIG. 1 determines a setting of a tracking region to be used for performing tracking in units of a tracking region according to an importance level regarding tracking based on a predetermined index. Specifically, the importance level determination unit 20 determines the importance level on the basis of situation information supplied from the situation determination unit 21 and the input information supplied from the input IF 5, and supplies importance level information based on a determination result to the tracking region determination unit 18. The situation determination unit 21 determines various tracking situations and supplies the situation information based on the determination result to the importance level determination unit 20. Specifically, the situation determination unit 21 understands the situation from an attribute of the person (human body) to be tracked, a relationship between the human body being tracked and a background, and the like on the basis of the identification information supplied from the human body identification unit 19 and the like, and supplies an understood result to the importance level determination unit 20 as the situation information. Processing (importance level determination processing) of determining the importance level performed by the importance level determination unit 20 using the situation information and the input information will be described below in detail.

The human motion estimation unit 22 generates the output information based on the distance information supplied from the distance information acquisition unit 11, the identification information supplied from the human body identification unit 19, and the like, and outputs the generated output information. Specifically, the human motion estimation unit 22 estimates the current position (for example, the position of a two-dimensional image and the position in a three-dimensional space) of the human body being tracked using each feature amount of the tracking feature amount dictionary, and outputs an estimation result in association with a tracking ID as the output information.

Specifically, the output information output from the human motion estimation unit 22 is used in the above-described output IF. Specifically, the output IF causes information regarding the human body position being tracked based on the output information to be displayed on the display. For example, the information regarding the human body position includes the two-dimensional rectangular position of the human body, information indicating the tracking region used for tracking, and the like. Note that this output information may be used for a tracking operation for a specific person by the moving camera, specifically, for the camera movement for tracking, or the like. Furthermore, the human motion estimation unit 22 estimates the motion of the human body on the basis of the above-described identification information, distance information, and the like, and supplies the motion information based on the estimation result to the time delay compensation unit 17. This motion information is used for generating the correction information for performing the time delay compensation according to the motion estimation of the human body by the time delay compensation unit 17.

"Importance Level Determination Processing"

Here, the above-described importance level determination processing will be described. At the start of tracking, the importance level determination unit 20 sets the setting of the tracking region for tracking (specifically, at least one of the number or the location) to a predetermined default setting. That is, the importance level determination unit 20 supplies information indicating the default setting as the importance level information to the tracking region determination unit 18. Furthermore, after the start of tracking, the importance level determination unit 20 determines an importance level of tracking, and supplies the importance level information indicating the setting of the tracking region according to the determination result to the tracking region determination unit 18. In a case of tracking a plurality of persons, the importance level determination unit 20 determines the importance level of each person. In this manner, the importance level determination unit 20 changes the setting of the tracking region for tracking according to the determined importance level.

FIG. 12 is a diagram for describing importance level determination processing. For example, in a case of an example of tracking three persons A, B, and C illustrated in FIG. 12, the importance level determination unit 20 performs setting (default setting) such that, for all the persons, two tracking regions of the head part and the waist part are used at the start of tracking. Then, in a case where the importance level of the person C is determined to be high after the start of tracking, the importance level determination unit 20 sets the tracking regions of the person C at four positions of the head part, the neck part, the waist part, and the knee part. Note that the tracking regions of the human bodies A and B at a normal importance level remain at two places.

As described above, by performing setting such that a large number of tracking regions is used for tracking the human body determined to have a high importance level, and a small number of tracking regions is used for tracking the human bodies having a non-high importance level, the tracking can be effectively performed while suppressing the overall processing load. That is, for the human body having a high importance level of tracking, the tracking regions to be used for tracking are increased to enhance the robustness. Note that the setting may be changed not only when tracking is performed for a plurality of persons but also when tracking is performed for only one person, or the setting of the location of the tracking region may be changed according to the importance level. The number and location of the tracking regions are not limited to the illustrated example.

FIG. 13 is a diagram illustrating a specific example of a determination index of an importance level. As illustrated in FIG. 13, the importance level determination unit 20 determines the importance level using the attribute of the person (human body), the background of the person, the CPU load, movement information of the person, and the like as indices. In a case where the attribute of the person is used as an index, the importance level determination unit 20 determines the importance level according to the attribute of the person such as gender or age. For example, as illustrated in the drawing, the importance level determination unit 20 determines the attribute of the person by a parameter related to the gender called "Gender" represented by a numerical value of 0 to 100 (0 to 50 is male and 50 to 100 is female) or a parameter related to the age (estimated age value) called "Age" represented by a numerical value of 0 to 100. For example, in a case of a setting for intensively tracking a child, the importance level determination unit 20 sets a large number of tracking regions in a case where the tracking person is a child, whereas sets a less number of tracking regions in a case where the tracking person is an adult. For example, these parameters can be extracted using machine learning.

Furthermore, in a case where the background is used as an index, the importance level determination unit 20 determines the importance level according to a similarity between the person and the background. For example, as illustrated in the drawing, the importance level determination unit 20 determines the similarity by a parameter called "Parts Score" related to a score of the similarity obtained from a correlation at the time of tracking. In a case where the score is low, there is a possibility that the person is similar to the background. For example, it is difficult to track a person existing in a background easily confused with the person (for example, a background of the same color as clothes, a complicated background, or the like). In such a case, the importance level determination unit 20 determines that the similarity is high, and allocates a large number of tracking regions.

The importance level determination unit 20 may use the CPU load as an index and determine the importance level according to the CPU load. For example, as illustrated in the drawing, the importance level determination unit 20 determines the entire CPU load by a parameter called "CPU Load" related to the CPU load of the entire system. For example, the importance level determination unit 20 allocates a large number of tracking regions in a case where the CPU load is equal to or less than a threshold, and reduces the number of tracking regions in a case where the CPU load exceeds the threshold, for example, in a case where the CPU load increases due to another processing.

Furthermore, the importance level determination unit 20 may use the movement information of the person as an index and determine the importance level according to the magnitude of the movement of the person (movement information of the human body). For example, as illustrated in the drawing, the importance level determination unit 20 determines the magnitude of the movement of the person by a parameter called "Velocity" representing a moving velocity of the person in a three-dimensional space or a parameter called "Pose Velocity" representing the magnitude of a pose change or a relative change in the position of the human body part. For example, the importance level determination unit 20 determines the magnitude of the movement from a movement amount of the human body part or the like in this manner, and tracks a person with large movement (for example, a child) in many tracking regions because it is difficult to track the person.

Figure 14:
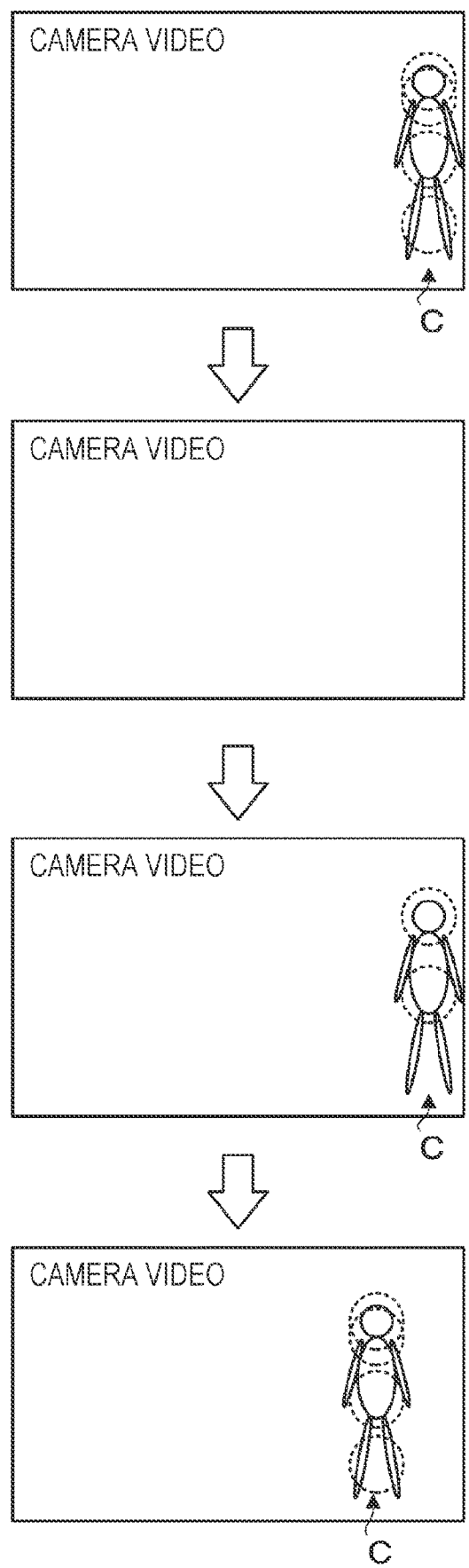
FIG. 14 is a diagram for describing resetting of a tracking region.

FIG. 14 is a diagram for describing resetting of a tracking region. It is assumed that a person who has been tracked in the tracking region according to the importance level is out of the frame and appears in the frame again. In this case, the importance level determination unit 20 performs a setting such that the tracking is performed with the default setting at the start of tracking, and in a case where the person can be identified as the person C being tracked, tracking in the tracking region according to the importance level is performed again. In the example illustrated in FIG. 14, the person C having a high importance level being tracked at the four locations of the head part, the neck part, the waist part, and the knee part deviates from the frame and appears an the frame again. In this case, at the start of tracking, first, the two tracking regions of the head part and the waist part are set (default setting), and when the person appearing in the frame is identified as the person C, the four tracking regions are set again.

Note that the tracking region for tracking is automatically set by the importance level determination unit 20, or the setting of the tracking region can be changed according to the input information from the user. That is, the user himself/herself can specify the setting. Specifically, the tracking region is specified via a UI included in the input IF 5 described above. Hereinafter, the UI used to specify the tracking region will be described.

"UT for Tracking Region Specification"

Figure 15:
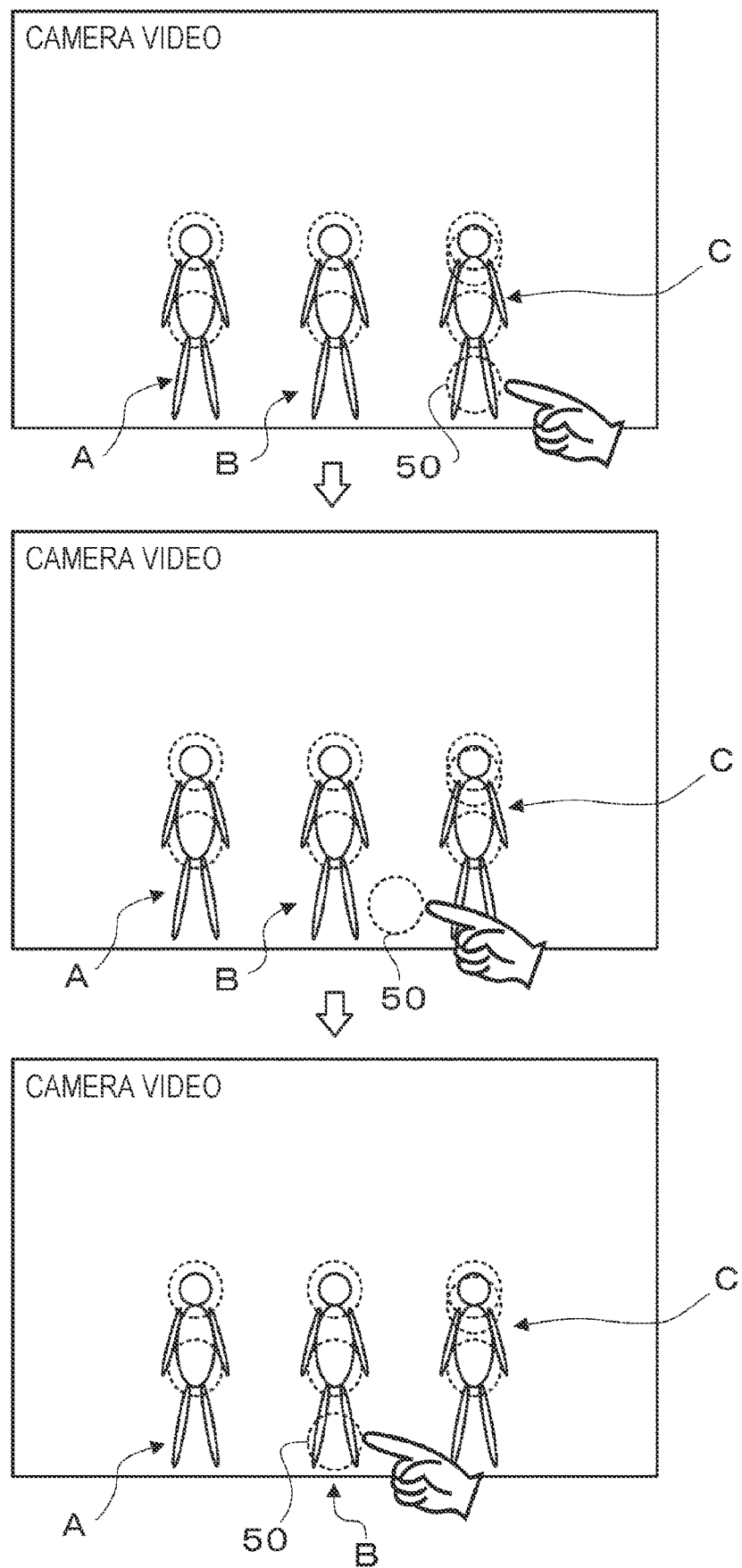
FIG. 15 is a diagram illustrating a specific example of a UI for specifying a tracking region.

FIG. 15 is a diagram illustrating a specific example of the UI for specifying the tracking region. Specifically, the UI for specifying the tracking region includes a touch panel device (touch panel display) incorporated in the display as the output IF. A camera video is displayed on the display. Note that a part icon 50 operable by the user using the touch panel device is superimposed and displayed on the camera video by the output IF. The part icon 50 represents the setting of the tracking region of the person in the camera video, and is an icon for allowing the user to change the setting of the tracking region.

Specifically, the UI for specifying the tracking region is configured such that the user can control the setting of the tracking region by dragging and dropping the part icon 50 superimposed on the human body being tracked. That is, operation information of the part icon 50 is supplied from the input IF 5 illustrated in FIG. 1 to the tracking region determination unit 18 as the input information. The tracking region determination unit 18 generates setting information based on the input information and supplies the setting information to the human body tracking unit 16, and sets the tracking region for tracking to match the display of the part icon 50.

For example, in the example illustrated in FIG. 15, the part icon 50 of the knee part, out of the part icons 50 at the four positions of the head part, the neck part, the waist part, and the knee part that are superimposed and displayed on the human body C, is moved by being dragged and dropped by the user to the knee part of the human body B on which the part icons 50 of two positions of the head part and the waist part are superimposed and displayed. As described above, the information processing device/can allow the user to easily and intuitively change the setting of the tracking region through the UI by having the UI for specifying the tracking region.

Figure 16:
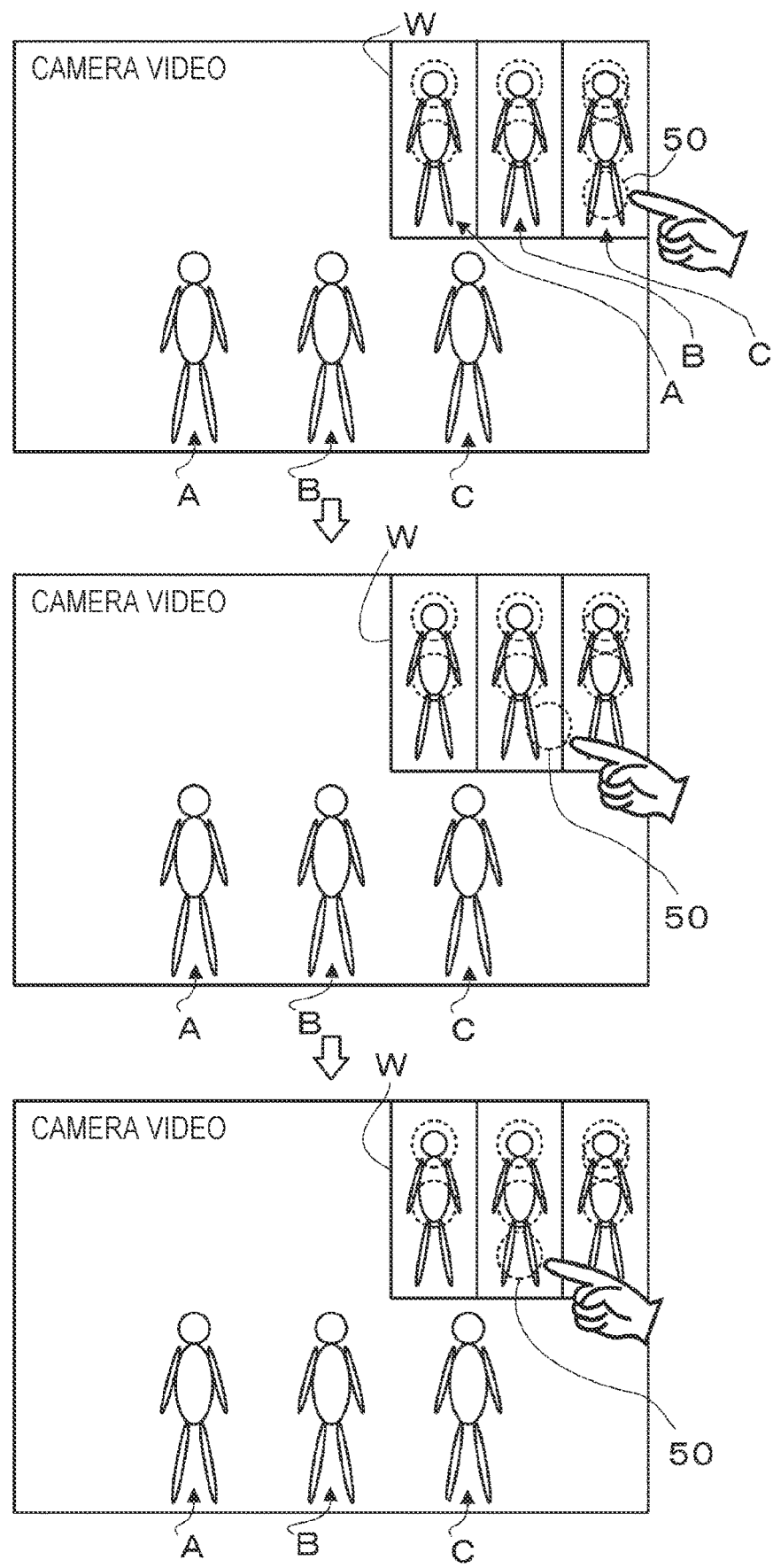
FIG. 16 is a diagram illustrating another specific example of the UI for specifying a tracking region.

FIG. 16 is a diagram illustrating another specific example of the UI for specifying the tracking region. In the example illustrated in FIG. 16, a display window W separate from the camera video is displayed on the display, and the human body in the camera video is extracted and displayed in the display window W. Then, the part icon 50 is superimposed and displayed on the human body in the display window N, and the setting of the tracking region can be controlled by dragging and dropping the part icon 50 in the display window W. By providing the display window N for controlling the setting of the tracking region in this manner, the camera video can be prevented from being hard to see due to the part icon 50.

Note that, in the examples illustrated in FIGS. 15 and 16, the part icon 50 is illustrated as a broken line roundly surrounding a part corresponding to the tracking region in the human body, but the shape and size of the part icon 50 are not limited thereto. For example, the part icon may be illustrated as each shape surrounding the tracking region or may be illustrated by dots. Furthermore, the UI for specifying the tracking region is not limited to the one using the touch panel device described above, and may move the part icon 50 by a mouse or a keyboard.

[1-3. Overall Flow of Processing by Arithmetic Processing Device]

Figure 17:
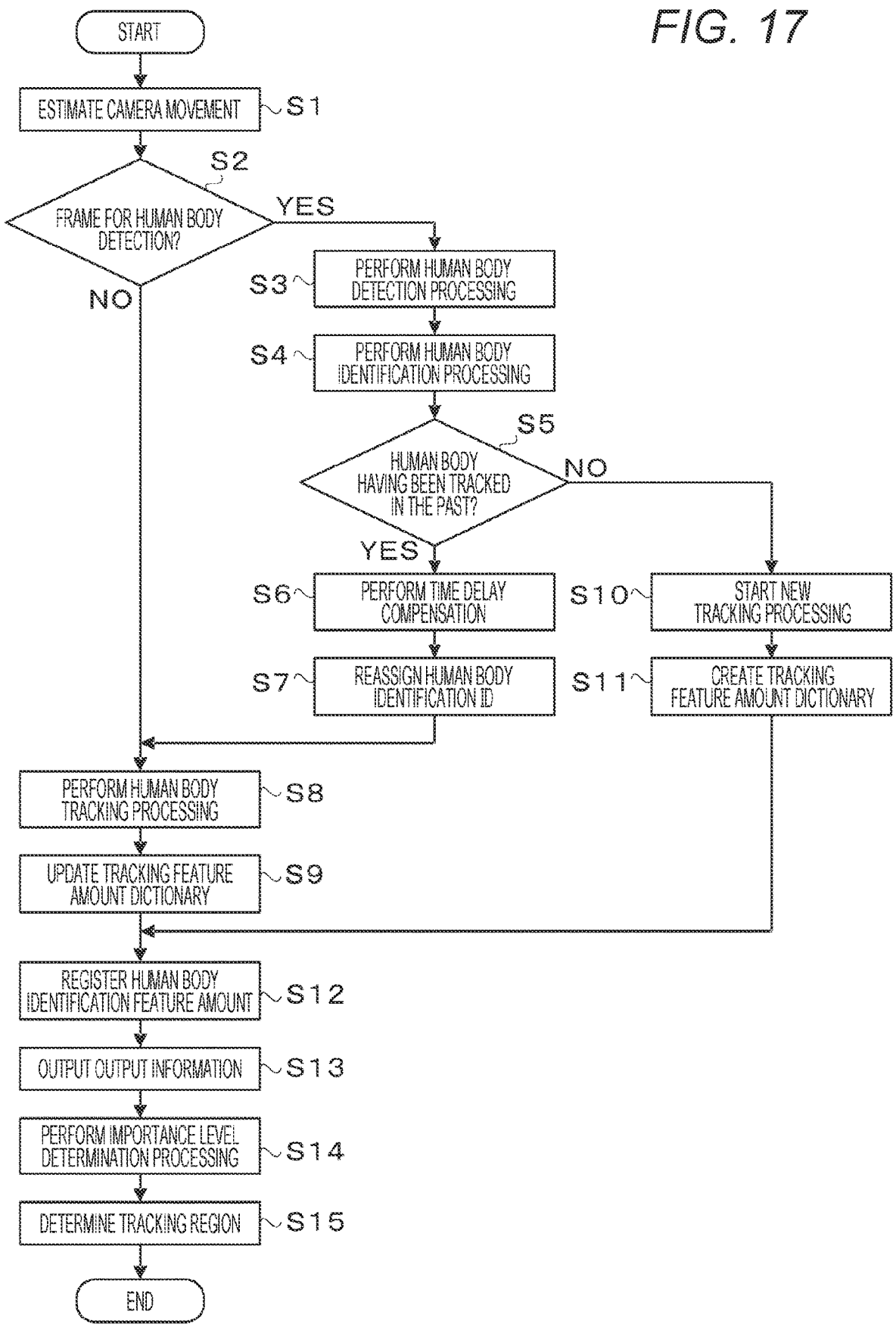
FIG. 17 is a flowchart illustrating an overall flow of processing by the arithmetic processing device.

FIG. 17 is a flowchart illustrating an overall flow of the processing by the arithmetic processing device 6. The processing illustrated in FIG. 17 is performed for each frame. First, when the processing is started, camera movement is estimated (step S1). Specifically, as described above, the camera movement estimation unit 15 illustrated in FIG. 1 generates the camera movement information using the image information, the IMU information, and the like, and supplies the camera movement information to the time delay compensation unit 17.

Next, whether or not the frame being processed is a frame for detecting the human body is determined (step S2), and the human body detection processing is performed in a case where it is determined that the frame being processed is the frame for detecting the human body (YES) (step S3). Specifically, the human body detection unit 14 illustrated in FIG. 1 applies the human body detection processing to the image information to detect the human body, and supplies the detection information based on the detection result to the human body tracking unit 16 and the human body identification unit 19.

Then, in a case where the human body is detected in the human body detection processing in step S3, the human body identification processing is performed (step S4) and whether or not the detected human body is the human body having been tracked in the past is determined (step S5). Specifically, the human body identification unit 19 illustrated in FIG. 1 performs the human body identification processing using the detection information and the like, and supplies the identification information based on the processing result to the situation determination unit 21 and the human motion estimation unit 22.

Next, in a case where it is determined that the detected human body is the human body having been tracked in the past (YES) in step S5, the time delay compensation processing according to the human body motion estimation is performed (step S6). Specifically, the time delay compensation unit 17 illustrated in FIG. 1 generates the correction information based on the motion information and the like, and supplies the correction information to the human body tracking unit 16.

Then, after the time delay compensation processing according to the human body motion estimation is performed in step S6, the human body identification ID is reassigned (step S7). By reassigning the human body identification ID, the setting of the tracking region for tracking is made to correspond to the human body identification ID after the reassignment.

After the processing in step S7 or in a case where it is determined that the frame being processed is not the frame for detecting the human body (NO) in step S2, the human body tracking processing is performed (step S8), and the tracking feature amount dictionary used in the human body tracking processing is updated (step S9). Specifically, the human body tracking unit 16 illustrated in FIG. 1 performs the human body, tracking processing using the image information, the identification information, the setting information, the correction information, and the like, and supplies the tracking information based on the processing result to the human body identification unit 19 and updates the tracking feature amount dictionary. Note that, in the human body tracking processing, the above-described time delay compensation processing at the start of tracking and the time delay compensation processing according to the camera movement are performed as necessary. Specifically, the time delay compensation unit 17 illustrated in FIG. 1 generates the correction information based on the camera movement information and the like, and supplies the correction information to the human body tracking unit 16.

On the other hand, in a case where it is determined that the detected human body is not the human body having been tracked in the past (NO) in step S5, the human body tracking unit 16 illustrated in FIG. 1 newly starts the human body tracking processing (step S10), and the tracking feature amount dictionary of the human body detected in the human body detection processing is newly created (step S11).

After the tracking feature amount dictionary is updated in step S9 or after the human body tracking feature amount dictionary is created in step S11, the feature amount for human body identification is registered in the identification feature amount dictionary used in the human body identification processing (step S12). Specifically, the human body identification unit 19 illustrated in FIG. 1 accumulates the feature amounts of the human body being tracked in the identification feature amount dictionary using the human body identification ID and the like.

Then, the output information based on the tracking result is supplied to the output IF (step S13). Specifically, the human motion estimation unit 22 illustrated in FIG. 1 generates the output information such as the two-dimensional rectangular position of the human body being tracked on the basis of information of the feature amounts stored in the tracking feature amount dictionary, and supplies the output information to the output IF.

Next, the importance level determination processing is performed by the importance level determination unit 20 illustrated in FIG. 1 (step S1), the tracking region according to the importance level is determined by the tracking region determination unit 18 (step S15), and the processing ends. Specifically, the situation determination unit 21 generates the situation information on the basis of the identification information and supplies the situation information to the importance level determination unit 20. The importance level determination unit 20 generates the importance level information on the basis of the input information, the situation information, and the like, and supplies the importance level information to the tracking region determination unit 18. Then, the tracking region determination unit 18 generates the setting information on the basis of the importance level information or the input information, and supplies the setting information to the human body tracking unit 16. This setting information is used in tracking in the next frame processing.

Note that the order of the processing by the arithmetic processing device 6 is not limited to that illustrated in FIG. 17, and can be appropriately changed as long as similar processing can be performed. For example, the processing in steps S13 and S14 is not limited to being performed after tracking (after steps S8 and S10) as described above, and may be performed before tracking (before steps S8 and S10).

The information processing device 7 according to the embodiment of the present technology tracks the human body in an image using images input in time series, using the tracking result obtained by performing tracking in units of a tracking region corresponding to a specific part of the human body. For example, in a case of tracking the entire human body, it is necessary to track all the above-described part points and the number of tracking points becomes very large. In contrast, the information processing device 7 performs tracking with a smaller number of tracking regions than, the part points. Therefore, the processing load can be suppressed as compared with the case of tracking the entire human body. Thereby, for example, it is possible to track the human body (for example, track a plurality of persons) detected in real time (for example, 30 fps) by a mobile terminal or the like.

Furthermore, by performing tracking in units of a tracking region, it is possible to implement tracking with high accuracy and robust in changes in appearance, pose, and the like as compared with the case of tracking the entire human body. Moreover, the processing load increases as the number of tracking people and the number of tracking regions increase. However, since the number of tracking regions for tracking can be adjusted according to the importance level based on the above-described indices, the processing load can be suppressed by performing appropriate setting.

2. Modification

The embodiment of the present technology has been specifically described. However, the present technology is not limited to the above-described embodiment, and various modifications based on the technical idea of the present technology an be made. For example, various modifications as will be described below can be made. Furthermore, one or a plurality of arbitrarily selected modes of the modifications to be described below can be appropriately combined. Furthermore, the configurations, methods, steps, shapes, materials, numerical values, and the like of the above-described embodiment can be combined with each other without departing from the gist of the present technology.

In the above-described embodiment, the object to be tracked has been the human body. However, the object to be tracked is not limited to the human body, and may be another object (for example, another organism such as an animal or a moving body such as a car) from which configuration elements can be extracted. For example, in a case of tracking an automobile, a window, a door, a tire, and the like can be set as the tracking regions.

In the above-described embodiment, the human body of the image information supplied in real time from the imaging sensor 3 has been tracked, but the image for tracking the human body is not limited thereto, and the human body of a recorded image may be tracked.

In the above-described embodiment, the human body detection unit 14 has performed the human body detection for each predetermined number of frames, but the timing of human body detection is not limited thereto. For example, the human body detection in a checking-answers manner after the first human body detection may be performed at any timing, or only the first human body detection may be performed and the human body detection in a checking-answers manner may be omitted.

In the above-described embodiment, the human body tracking unit 16 has performed the human body tracking for each frame, but the timing of human body tracking is not limited thereto. The human body tracking may be performed at any timing as long as the human body tracking can be performed at a cycle shorter than the cycle at which the human body detection can be performed. For example, the human body tracking may be performed at timing of once every two frames for an image of 60 fps.

In the above-described embodiment, a case has been described in which the human body identification is performed when a new human body is detected, and in a case where the detected person is the human body being tracked, the tracking region is returned to the previous setting, but the purpose of identifying the human body is not limited thereto. For example, an arbitrary human body specified by user or the like may be tracked, and the human body identification may be performed to determine whether or not the arbitrary human body is the human body being tracked.

3. Application

Next, an electronic device to which the information processing device according to the above-described embodiment, modifications, and the like is applied will be described. The information processing device is suitable for use in grasping the movement of the object in an image. Therefore, the present invention can be applied to the information processing device included in a controller device of a moving body such as a drone, a camera device such as a monitoring camera or an in-vehicle camera, a robot such as a security robot or a watching robot, as the electronic device.

Note that the present technology can also have the following configurations.

(1)
An information processing device including:
a control unit configured to track an object in an image using images input in time series, using a tracking result obtained by performing tracking in units of a tracking region corresponding to a specific part of the object.

(2)
The information processing device according to (1), in which
the control unit extracts a configuration element of the object in the image using the image, and detects the object in the image using an extraction result.

(3)
The information processing device according to (2), in which
the control unit detects the object in the image for each predetermined number of frames equal to or larger than the number of frames required to detect the object in the image.

(4)
The information processing device according to any one of (1) to (3), in which
the control unit tracks the object in the image by real-time processing for each frame.

(5)
The information processing device according to any one of (1) to (4), in which
the control unit performs tracking in the units of a tracking region, using one or more tracking regions, and in a case of performing tracking in the units of a tracking region, using a plurality of tracking regions, the control unit tracks the object is the image on the basis of the tracking result obtained by performing tracking in each of the tracking regions.

(6)
The information processing device according to any one of (1) to (5), in which
the control unit selects a tracking region to be used for tracking in the units of a tracking region from a plurality of candidates.

(7)
The information processing device according to any one of (1) to (6), in which
the control unit determines a setting of a tracking region to be used for tracking is the units of a tracking region according to an importance level related to tracking based on a predetermined index.

(8)
The information processing device according to (7), in which
the predetermined index includes at least one of an attribute of the object, a background of the object, a CPU load, or magnitude of movement of the object.

(9)
The information processing device according to any one of (1) to (8), in which
the control unit changes a setting of a tracking region to be used for tracking is the units of a tracking region according to input information from a user.

(10)
The information processing device according to any one of (1) to (9), in which
the control unit identifies whether or not a new object in the image is a predetermined object on the basis of a state represented by a plurality of configuration elements of each object.

(11)
The information processing device according to any one of (1) to (10), in which
the control unit detects the object in the image using the image, and performs compensation processing of compensating for movement of the object from start of detection to completion of detection of the object in the image when tracking the object in the image.

(12)
A program for causing an information processing device to execute an information processing method including:
by a control unit,
tracking an object in an image using images input in time series, using a tracking result obtained by performing tracking in units of a tracking region corresponding to a specific part of the object.

(13)
The program according to (12), for causing the information processing device to execute processing of:
displaying, on a display on which the image is displayed, an icon for prompting a user to change a setting of a tracking region to be used for tracking in the units of a tracking region.

(14)
An information processing method including:
by a control unit,
tracking as object in an image using images input in time series, using a tracking result obtained by performing tracking in units of a tracking region corresponding to a specific part of the object.

REFERENCE SIGNS LIST

1 Tracking system
5 Input IF
6 Arithmetic processing device
7 Information processing device
11 Distance information acquisition unit
12 Image acquisition unit
13 IMU information acquisition unit
14 Human body detection unit
15 Camera movement estimation unit
16 Human body tracking unit
17 Time delay compensation unit
18 Tracking region determination unit
19 Human body identification unit
20 Importance level determination unit
21 Situation determination unit
22 Human motion estimation unit
50 Part icon

The invention claimed is:

1. An information processing device comprising:
circuitry configured to
track an object in an image using images input in time series, using a tracking result obtained by performing tracking in units of a tracking region corresponding to a specific part of the object,
determine a setting of the tracking region to be used for tracking in the units of the tracking region according to an importance level related to tracking based on a predetermined index, wherein the predetermined index includes at least one of a CPU load or magnitude of movement of the object,
set a first number of tracking regions to be used for tracking according to the magnitude of movement of the object being a first amount, and
set a second number of tracking regions less than the first number to be used for tracking according to the magnitude of movement of the object being a second amount less than the first amount,
wherein each of the tracking regions corresponds to a different part of the object.

2. The information processing device according to claim 1, wherein
the circuitry is further configured to extract a configuration element of the object in the image using the image, and detect the object in the image using an extraction result.

3. The information processing device according to claim 2, wherein
the circuitry is further configured to detect the object in the image for each predetermined number of frames equal to or larger than a number of frames required to detect the object in the image.

4. The information processing device according to claim 1, wherein the circuitry is further configured to track the object in the image by real-time processing for each frame.

5. The information processing device according to claim 1, wherein
the circuitry is further configured to
perform tracking in the units of a tracking region, using one or more tracking regions, and in a case of performing tracking in the units of a tracking region, using a plurality of tracking regions, and
track the object in the image on a basis of the tracking result obtained by performing tracking in each of the tracking regions.

6. The information processing device according to claim 1, wherein
the circuitry is further configured to select a tracking region to be used for tracking in the units of a tracking region from a plurality of candidates.

7. The information processing device according to claim 1, wherein
the predetermined index further includes an attribute of the object or a background of the object.

8. The information processing device according to claim 7, wherein the object is a person and the attribute of the object includes gender or age of the person.

9. The information processing device according to claim 7, wherein the background of the object includes a similarity between the object and the background.

10. The information processing device according to claim 1, wherein
the circuitry is further configured to change a setting of a tracking region to be used for tracking in the units of a tracking region according to input information from a user.

11. The information processing device according to claim 1, wherein
the circuitry is further configured to identify whether or not a new object in the image is a predetermined object on a basis of a state represented by a plurality of configuration elements of each object.

12. The information processing device according to claim 1, wherein
the circuitry is further configured to detect the object in the image using the image, and perform compensation processing of compensating for movement of the object from start of detection to completion of detection of the object in the image when tracking the object in the image.

13. The information processing device according to claim 1, wherein the circuitry is further configured to
set a first number of tracking region to be used for tracking according to the CPU load being equal to or less than a predetermined threshold, and
set a second number of tracking regions less than the first number to be used for tracking according to the CPU load being greater than the predetermined threshold.

14. The information processing device according to claim 1, wherein the object is a person and each of the tracking regions corresponds to a different specific part of a human body.

15. A non-transitory computer-readable medium having embodied thereon a program, which when executed by a computer causes the computer to execute an information processing method, the method comprising:
tracking an object in an image using images input in time series, using a tracking result obtained by performing tracking in units of a tracking region corresponding to a specific part of the object;
determining a setting of the tracking region to be used for tracking in the units of the tracking region according to an importance level related to tracking based on a predetermined index, wherein the predetermined index includes at least one of a CPU load or magnitude of movement of the object;
setting a first number of tracking regions to be used for tracking according to the magnitude of movement of the object being a first amount; and
setting a second number of tracking regions less than the first number to be used for tracking according to the magnitude of movement of the object being a second amount less than the first amount,
wherein each of the tracking regions corresponds to a different part of the object.

16. The non-transitory computer-readable medium according to claim 15, wherein the method further comprises:
displaying, on a display on which the image is displayed, an icon for prompting a user to change a setting of a tracking region to be used for tracking in the units of a tracking region.

17. An information processing method comprising:
tracking an object in an image using images input in time series, using a tracking result obtained by performing tracking in units of a tracking region corresponding to a specific part of the object;
determining a setting of the tracking region to be used for tracking in the units of the tracking region according to an importance level related to tracking based on a predetermined index, wherein the predetermined index includes at least one of a CPU load or magnitude of movement of the object;
setting a first number of tracking regions to be used for tracking according to the magnitude of movement of the object being a first amount; and
setting a second number of tracking regions less than the first number to be used for tracking according to the magnitude of movement of the object being a second amount less than the first amount,
wherein each of the tracking regions corresponds to a different part of the object.

* * * * *